US 11,468,587 B2

(12) United States Patent
Peri et al.

(10) Patent No.: US 11,468,587 B2
(45) Date of Patent: Oct. 11, 2022

(54) SYSTEM AND METHOD FOR DEPTH MAP RECOVERY

(71) Applicant: Samsung Electronics Co., Ltd., Suwon-si (KR)

(72) Inventors: Christopher A. Peri, Mountain View, CA (US); Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/093,519

(22) Filed: Nov. 9, 2020

(65) Prior Publication Data
US 2021/0358158 A1 Nov. 18, 2021

Related U.S. Application Data

(60) Provisional application No. 63/060,623, filed on Aug. 3, 2020, provisional application No. 63/023,438, filed on May 12, 2020.

(51) Int. Cl.
*G06T 7/593* (2017.01)
*G06T 7/73* (2017.01)
(Continued)

(52) U.S. Cl.
CPC ............ *G06T 7/593* (2017.01); *G06T 3/4007* (2013.01); *G06T 5/50* (2013.01); *G06T 7/73* (2017.01);
(Continued)

(58) Field of Classification Search
CPC ......... G06T 7/593; G06T 7/73; G06T 3/4007; G06T 5/50; G06T 2207/10024; G06T 2207/10028
See application file for complete search history.

(56) References Cited

U.S. PATENT DOCUMENTS 8,339,470 B2 * 12/2012 Narayanan ............ H04N 5/345
  348/222.1
9,288,505 B2   3/2016 Chen et al.
(Continued)

FOREIGN PATENT DOCUMENTS

JP    2017-526042 A    9/2017
KR    10-1247914 B1    3/2013
(Continued)

OTHER PUBLICATIONS

International Search Report and Written Opinion of the International Searching Authority in connection with International Application No. PCT/KR2021/005929 dated Aug. 24, 2021, 8 pages.

*Primary Examiner* — Gregory M Desire

(57) ABSTRACT

A method for reconstructing a downsampled depth map includes receiving, at an electronic device, image data to be presented on a display of the electronic device at a first resolution, wherein the image data includes a color image and the downsampled depth map associated with the color image. The method further includes generating a high resolution depth map by calculating, for each point making up the first resolution, a depth value based on a normalized pose difference across a neighborhood of points for the point, a normalized color texture difference across the neighborhood of points for the point, and a normalized spatial difference across the neighborhood of points. Still further, the method includes outputting, on the display, a reprojected image at the first resolution based on the color image and the high resolution depth map. The downsampled depth map is at a resolution less than the first resolution.

20 Claims, 13 Drawing Sheets

(51) Int. Cl.
*G06T 3/40* (2006.01)
*G06T 5/50* (2006.01)

(52) U.S. Cl.
CPC .............. *G06T 2207/10024* (2013.01); *G06T 2207/10028* (2013.01)

(56) References Cited

U.S. PATENT DOCUMENTS

| | | | |
|---|---|---|---|
| 9,412,172 B2 * | 8/2016 | Sorkine-Hornung | G06T 5/00 |
| 9,900,584 B2 | 2/2018 | Nisenzon | |
| 10,074,158 B2 * | 9/2018 | Siddiqui | G06T 3/4007 |
| 10,129,523 B2 * | 11/2018 | Michail | G06T 19/00 |
| 10,362,296 B2 | 7/2019 | Price et al. | |
| 10,499,046 B2 | 12/2019 | Toksvig et al. | |
| 10,600,154 B2 * | 3/2020 | Kwan | H04N 13/133 |
| 10,609,355 B2 | 3/2020 | Chen et al. | |
| 11,057,604 B2 * | 7/2021 | Zhou | H04N 13/25 |
| 2010/0165077 A1 * | 7/2010 | Yin | H04N 19/597 348/E13.001 |
| 2015/0093015 A1 * | 4/2015 | Liang | G06K 9/6267 382/154 |
| 2015/0254811 A1 | 9/2015 | Sahu et al. | |
| 2015/0373035 A1 | 12/2015 | Patne et al. | |
| 2016/0094829 A1 | 3/2016 | Georgiev et al. | |
| 2019/0004533 A1 * | 1/2019 | Huang | H04N 5/2258 |
| 2019/0303660 A1 | 10/2019 | Bourdev | |
| 2020/0099920 A1 | 3/2020 | Khamis et al. | |
| 2021/0358158 A1 * | 11/2021 | Peri | G06T 7/73 |

FOREIGN PATENT DOCUMENTS

| | | |
|---|---|---|
| KR | 10-2014-0095842 A | 8/2014 |
| KR | 10-2018-0080183 A | 7/2018 |
| KR | 10-2020-0014889 A | 2/2020 |

* cited by examiner

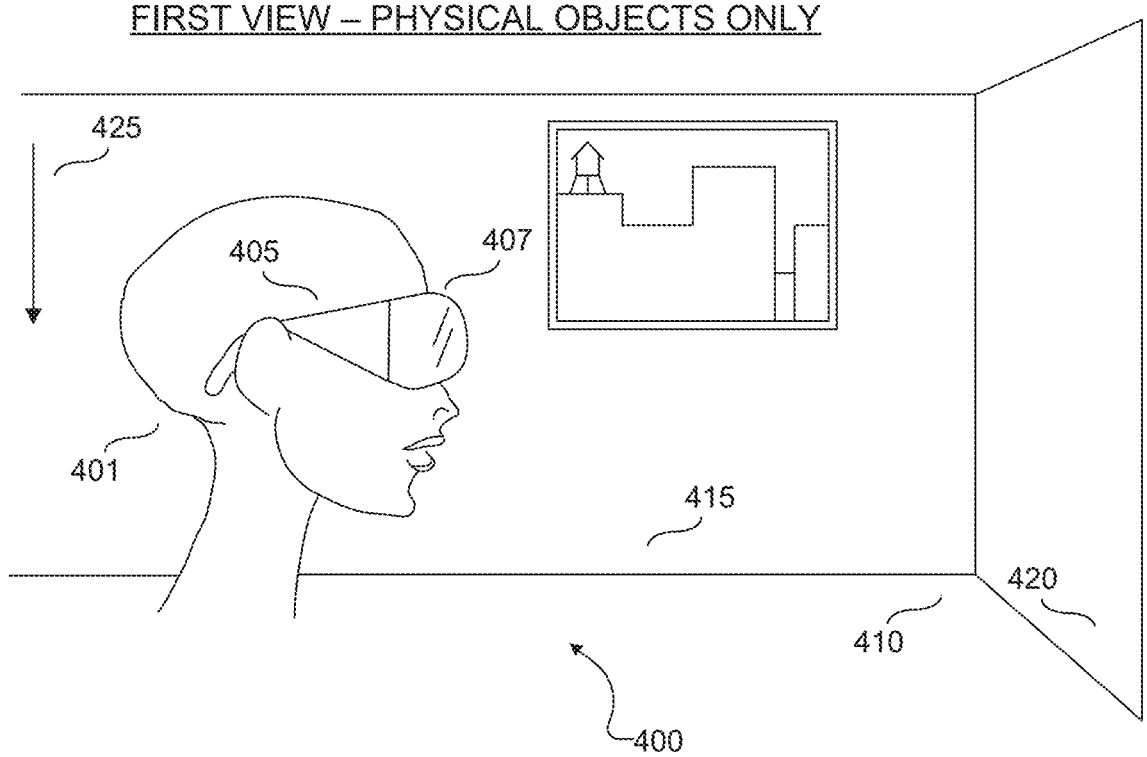
FIRST VIEW – PHYSICAL OBJECTS ONLY
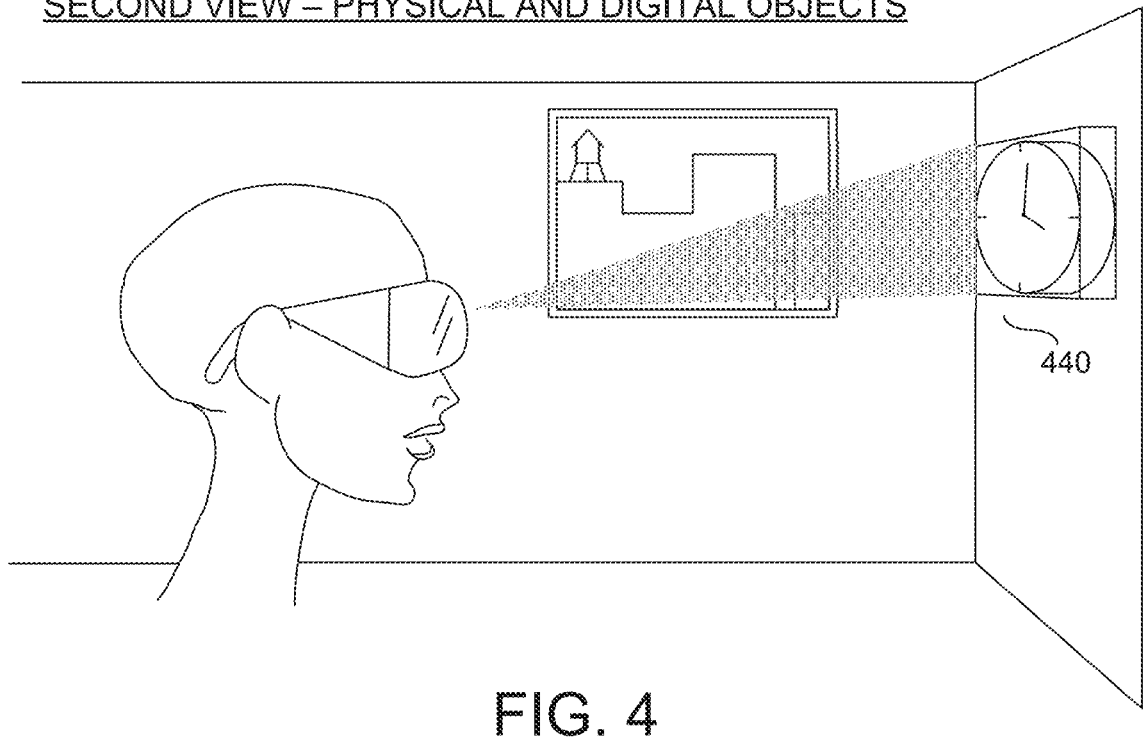
SECOND VIEW – PHYSICAL AND DIGITAL OBJECTS
FIG. 4

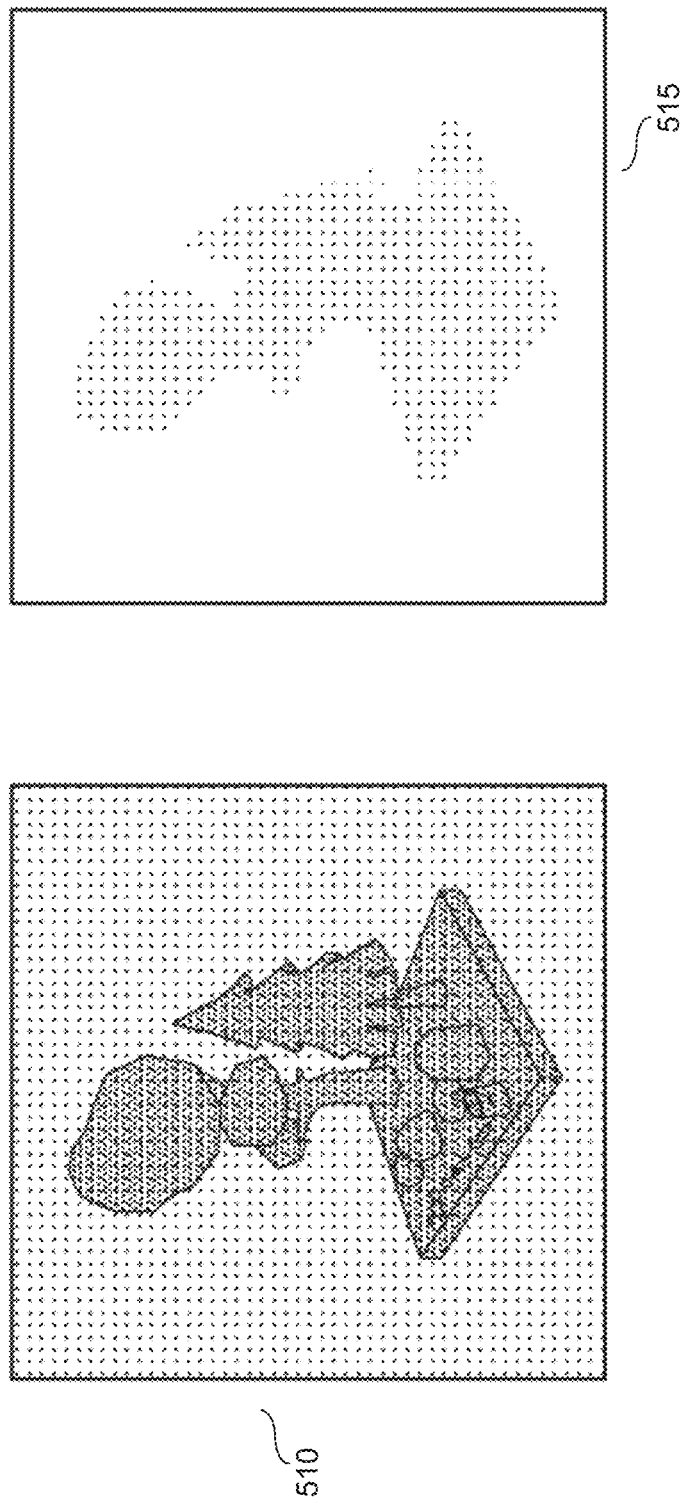

SYSTEM AND METHOD FOR DEPTH MAP RECOVERY

CROSS-REFERENCE TO RELATED APPLICATION AND CLAIM OF PRIORITY

This application claims priority under 35 U.S.C. § 119(e) to U.S. Provisional Patent Application No. 63/023,438 filed on May 12, 2020 and U.S. Provisional Patent Application No. 63/060,623 filed on Aug. 3, 2020. The above-identified provisional patent application is hereby incorporated by reference in their entireties.

TECHNICAL FIELD

This disclosure relates generally to a system and method for depth map recovery.

BACKGROUND

In certain video rendering and display systems, including, without limitation, systems where an electronic device (for example, a smartphone or tablet) provides image content over a data link to be viewed as head pose adjusted content (for example, as digital objects in an extended reality (XR) display) at a head mounted display (HMD), the time associated with sending image content, including a depth map for the image, over the data link connecting the electronic device presents a performance bottleneck for the system. Reducing the time for transmitting image data to the HMD without adversely affecting one or more dimensions of the performance of the system (for example, by consuming battery power more rapidly, or providing a degraded display at the HMD remains a source of technical challenges and opportunities for improvement in the art.

SUMMARY

This disclosure provides systems and methods for reduced communication load through lossless communication of a downsampled depth map and improved recovery of depth detail.

In a first embodiment, a method for reconstructing a downsampled depth map includes receiving, at an electronic device, image data to be presented on a display of the electronic device at a first resolution, wherein the image data includes a color image and the downsampled depth map associated with the color image. The method further includes generating a high resolution depth map by calculating, for each point making up the first resolution, a depth value based on a normalized pose difference across a neighborhood of points for the point, a normalized color texture difference across the neighborhood of points for the point, and a normalized spatial difference across the neighborhood of points. Still further, the method includes outputting, on the display, a reprojected image at the first resolution based on the color image and the high resolution depth map. The downsampled depth map is at a resolution less than the first resolution.

In a second embodiment, an electronic device includes a display, a processor and a memory, containing instructions, which when executed by the processor, cause the processor to receive, at an electronic device, image data to be presented on the display of the electronic device at a first resolution, wherein the image data includes a color image and the downsampled depth map associated with the color image. When executed, the instructions further cause the electronic device to generate a high resolution depth map by calculating, for each point making up the first resolution, a depth value based on a normalized pose difference across a neighborhood of points for the point, a normalized color texture difference across the neighborhood of points for the point, and a normalized spatial difference across the neighborhood of points and output, on the display, a reprojected image at the first resolution based on the color image and the high resolution depth map. The downsampled depth map is at a resolution less than the first resolution.

In a third embodiment, a non-transitory computer-readable medium containing program code, which when executed by a processor, causes an electronic device to receive, at an electronic device, image data to be presented on a display of the electronic device at a first resolution, wherein the image data includes a color image and the downsampled depth map associated with the color image. When executed by the processor, the program code further causes the electronic device to generate a high resolution depth map by calculating, for each point making up the first resolution, a depth value based on a normalized pose difference across a neighborhood of points for the point, a normalized color texture difference across the neighborhood of points for the point, and a normalized spatial difference across the neighborhood of points and output, on the display, a reprojected image at the first resolution based on the color image and the high resolution depth map. Further, the downsampled depth map is at a resolution less than the first resolution.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates aspects of an XR viewing experience provided at an HMD according to certain embodiments of this disclosure;

FIG. 5B illustrates two examples of downsampling schema that can be applied to depth maps to be recovered according to various embodiments of this disclosure;

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
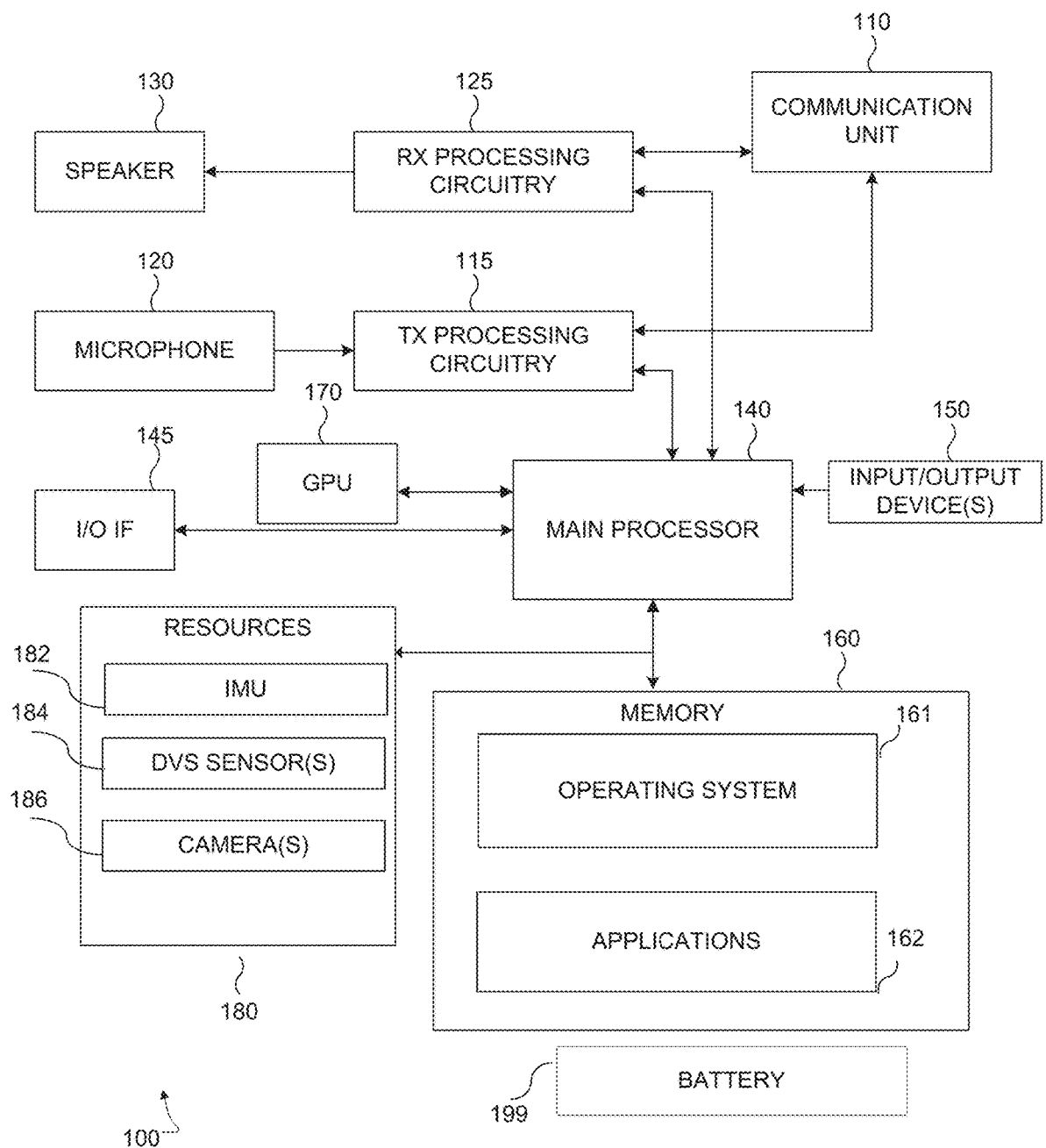
FIG. 1 illustrates a non-limiting example of an electronic device according to certain embodiments of this disclosure.

FIG. 1 illustrates a non-limiting example of a device 100 in an extended reality (XR) system according to some embodiments of this disclosure. According to various embodiments of this disclosure, the device 100 could be implemented as one or more of: a smartphone, a tablet, or laptop computer for providing an extended reality (XR) experience. The embodiment of device 100 illustrated in FIG. 1 is for illustration only, and other configurations are possible. However, suitable devices come in a wide variety of configurations, and FIG. 1 does not limit the scope of this disclosure to any particular implementation of a device. For example, while certain embodiments according to this disclosure are described as being implemented on mobile XR platforms, embodiments according to this disclosure are not so limited, and embodiments implemented on virtual reality (VR) platforms are within the contemplated scope of this disclosure.

As shown in the non-limiting example of FIG. 1, the device 100 includes a communication unit 110 that can include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, extended reality (XR) applications, augmented reality (AR) applications, operating systems, device security (e.g., anti-theft and device tracking) applications or any other applications that access resources of device 100, the resources of device 100 including, without limitation, speaker 130, microphone 120, input/output devices 150, and additional resources 180. According to some embodiments, applications 162 include applications that can consume or otherwise utilize semantic maps of physical objects in a field of view of visual sensors of device 100.

The communication unit 110 can receive an incoming RF signal, for example, a near field communication signal such as a BLUETOOTH or WI-FI signal. According to certain embodiments, the communication unit 110 is configured to create one or more links for sending and receiving data with a head mounted display (HMD). The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 can contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller. According to certain embodiments, main processor 140 is a low-power processor, such as a processor that includes control logic for minimizing consumption of battery 199, or minimizing heat buildup in the device 100.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140. According to certain embodiments, the main processor 140 can execute one or more algorithms for encoding data (i.e., compressing) such that it requires fewer bits. Similarly, main processor 140 can execute one or more algorithms for decoding compressed data.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, an augmented or virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random-access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170 that renders source data as pixels for display on one or more displays of device 100 or a HMD.

According to certain embodiments, device 100 includes a variety of additional resources 180 that can, if permitted, be accessed by applications 162. According to certain embodiments, additional resources 180 include an accelerometer or inertial measurement unit (IMU) 182 that can detect movements of the electronic device along one or more degrees of freedom. Additional resources 180 include, in some embodiments, one or more dynamic vision sensors 184, and one or more cameras 186 (for example, complementary metal oxide semiconductor (CMOS) sensor type cameras) of device 100. According to various embodiments, DVS sensor(s) 184 comprises a pair of dynamic vision sensors spaced at a stereoscopically appropriate distance for estimating depth at over a field of depth of interest. According to some embodiments DVS sensor(s) 184 comprises a plurality of DVS sensors with overlapping, or partially overlapping fields of view.

According to various embodiments, the above-described components of device 100 are powered by battery 199 (for example, a rechargeable lithium-ion battery), whose size, charge capacity and load capacity are, in some embodiments, constrained by the form factor and user demands of the device. As a non-limiting example, in embodiments where device 100 is a smartphone, the battery 199 is dimensioned to fit within the housing of the smartphone, and is configured not to support current loads (for example, by running a graphics processing unit at full power for sustained periods) causing heat buildup. As a further example, in embodiments where device 100 is a head mounted device, the size (and by implication, charge capacity) of battery 199 may be constrained by a need to keep device 100 as light as possible, to reduce neck strain on users and facilitate easy head movement.

Although FIG. 1 illustrates one example of a device 100 for reducing communication loads through lossless data reduction according to some embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operating environment in which various features disclosed in this patent document can be used, these features could be used in any other suitable system.

Figure 2:
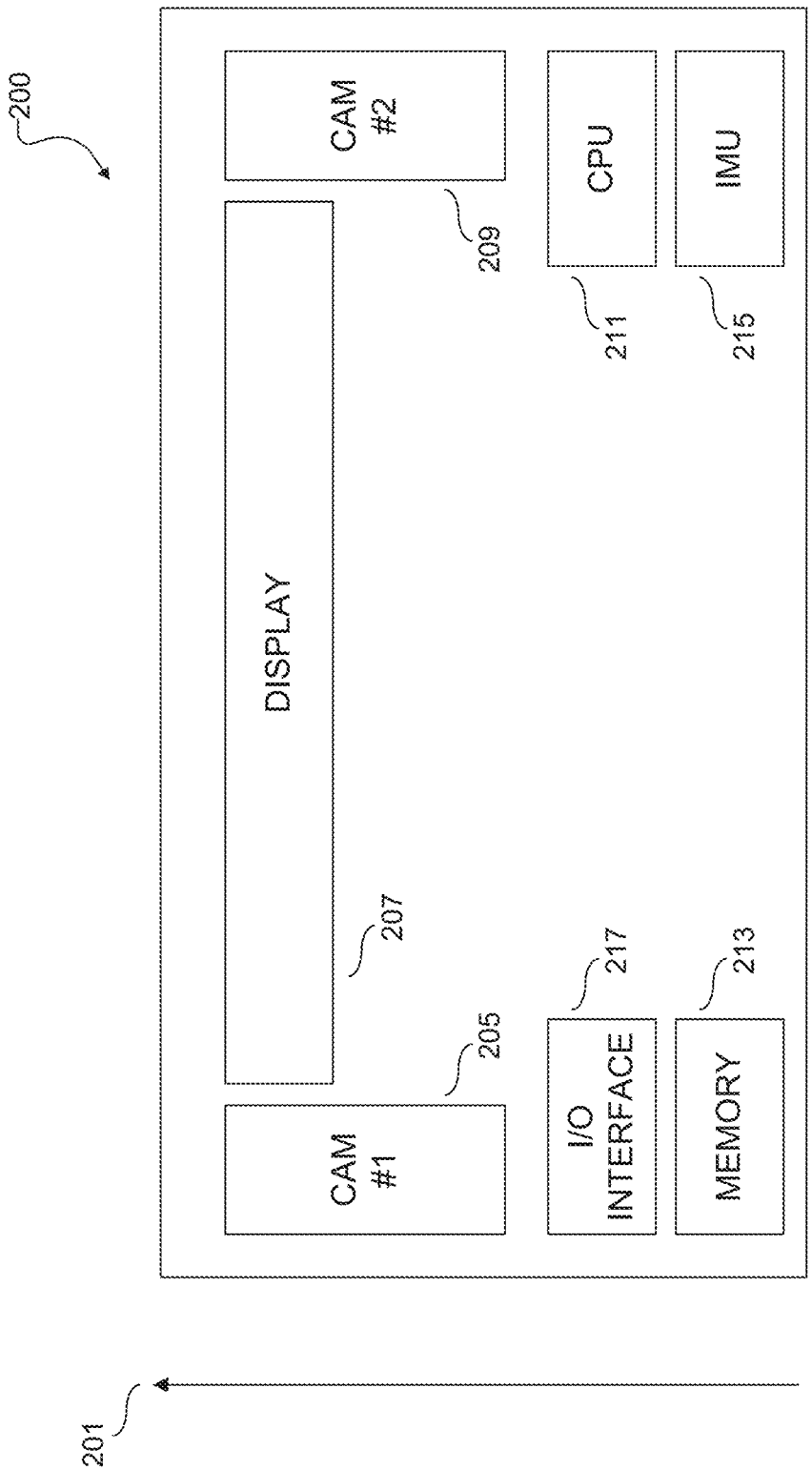
FIG. 2 illustrates a further example of an electronic device according to various embodiments of this disclosure.

FIG. 2 illustrates an example of an apparatus 200 that can function as a head mounted display (HMD) according to one or more embodiments of this disclosure. The embodiment of the apparatus 200 shown in FIG. 2 is for illustration only and other embodiments could be used without departing from the scope of the present disclosure. According to some embodiments, apparatus 200 may operate as an accessory device to an electronic device (for example, a smartphone, a tablet or other computing platform capable of rendering pixels and transmitting same to apparatus 200).

Referring to the non-limiting example of FIG. 2, the apparatus 200 includes an externally oriented camera 205. For the purposes of explaining this non-limiting example, the arrow 201 is provided. Arrow 201 points externally, towards a field of view away from the direction of projection of an internal-facing display of apparatus 200. According to various embodiments, externally oriented camera 205 is an RGB digital video camera (for example, a camera using a CMOS sensor). According to some embodiments, externally oriented camera 205 is a camera capable of detecting light at wavelengths outside the visible range of the human eye (for example, infrared). In certain embodiments, externally oriented camera 205 is a dynamic vision sensor (DVS), which provides an event stream of changes in the intensity of light received at pixels of a sensor of the DVS. In this non-limiting example, externally-oriented camera 205 generates image data, either as an event stream or as discrete image frames, providing source data for an XR display.

Referring to the non-limiting example of FIG. 2, the apparatus 200 includes display 207. According to various embodiments, display 207 displays, in an internally-facing direction (e.g., in a direction having a component that is opposite to arrow 301) items of XR content in conjunction with views of objects in an externally-facing field of view. According to some embodiments, display 207 is clear (similar to, for example, the displays used in "smart glasses" or "heads-up displays" on the cockpit glass of an airplane) and views of objects in externally-facing fields of view come from light passing through display 207. According to various embodiments, display 207 is opaque, and views of objects in externally-facing fields of view come from image data from externally-oriented cameras (for example, externally-oriented camera 205).

According to various embodiments, apparatus 200 includes a second camera 209. In some embodiments, the second camera 209 is an externally-oriented camera of the same type as externally-oriented camera 205, thereby forming a stereoscopic pair that can generate image data comprising depth estimation. In certain embodiments, the second camera 209 is an externally-oriented camera with a different sensor type than externally-oriented camera 205. For example, in some embodiments, to extend battery life and minimize processor usage, externally-oriented camera 205 is a DVS sensor, and the second camera 209 is a CMOS type camera, which, while less efficient than a DVS sensor, can provide additional image data (for example, data regarding colors and elements of a scene whose brightness may not change at a level detectable by a DVS sensor) that is useful for object recognition. According to various embodiments, second camera 309 is an internally-facing camera that tracks the motion of a user's eyes, and by implication, the direction of the user's gaze. Gaze tracking can be used to support foveal rendering of items of AR content, which can conserve battery and processor resources by rendering items of AR content away from a viewer's gaze at lower resolutions.

According to certain embodiments, the apparatus 200 includes processor 211 and memory 213. In certain embodiments, the memory 213 contains program code, which when executed by processor 211, causes apparatus 200 to execute an XR application.

Referring to the non-limiting example of FIG. 2, the apparatus 200 includes an inertial measurement unit 215, which generates head pose data, and in some embodiments, location data associated with the motion of apparatus 200 along one or more degrees of freedom. In certain embodiments, data output from IMU 215 may be used for positioning (for example, to confirm a geospatial position of apparatus 200), or to determine the current pose of the viewing device, as well as present changes in pose (for example, rotations) of the pose of the apparatus 200.

In some embodiments, the apparatus 200 includes input/output interface 217. According to various embodiments, the I/O interface 217 provides communicative connectivity between the apparatus 200 and an electronic device, such as a smartphone or computer to which apparatus 200 is a companion device. According to certain embodiments, the I/O interface 217 connects the apparatus 200 over a network to an electronic device. I/O interface is, in certain embodiments, a wireless communication interface, such as a BLUETOOTH transceiver, or communication hardware supporting communications over one or more longer range wireless systems (for example, communication unit 110 in FIG. 1).

Figure 3:
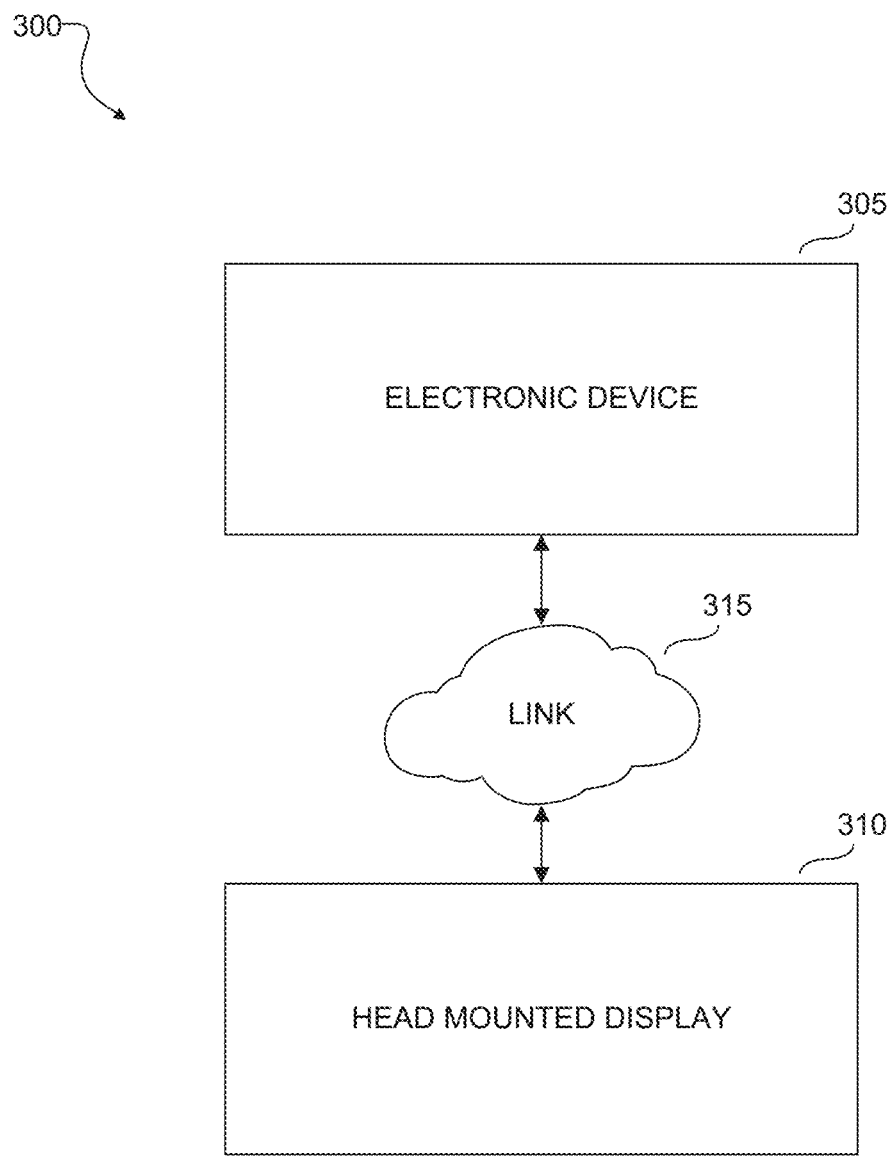
FIG. 3 illustrates an example of a network context for utilizing two or more devices to provide an extended reality (XR) display according to certain embodiments of this disclosure.

FIG. 3 illustrates an example of a network context 300 for utilizing two or more devices to provide an extended reality (XR) display according to various embodiments of this disclosure. The embodiment of the network context 300 shown in FIG. 3 is for illustration only and other examples could be used without departing from the scope of the present disclosure. As used in this disclosure, the term "extended reality" encompasses a video display that combines functionalities of virtual reality (VR), augmented reality (AR) and mixed reality (MR) displays. According to certain embodiments, an XR display can combine elements of a live view (for example, the world as seen through a camera of a device or a transparent projection surface of a set of "smart glasses") of a user's physical world, with digital elements presented to appear as dynamic (i.e., changing) three-dimensional (3D) objects existing in, and interacting with the physical world as seen through the live view.

In many instances, the overall XR experience can be improved by apportioning the computational load associated with rendering and projecting the digital components of an XR display across two or more computing platforms. By having a separate device (for example, a tablet or smartphone) perform the often computationally expensive work of rendering pixels for display, the apparatus (for example, a head mounted display or smart glasses) upon which the XR display is viewed can be made lighter (for example, by having a smaller battery), or more comfortable (for example, by utilizing a lower-power processor that produces less heat).

Referring to the non-limiting example of FIG. 3, in certain embodiments according to this disclosure, an XR display is provided at a HMD 310 (for example, a device like apparatus 200 in FIG. 2), which is communicatively coupled to (i.e., can receive and send data), via a link 315 to an electronic device 305 (for example, a device like device 100 in FIG. 1). According to certain embodiments, electronic device 305 is physically separate from HMD 310, and has greater opportunity (for example, by virtue of a more powerful processor, a separate graphics processing card or chip, or has a housing better able to handle heat generated by a processor) to perform computationally demanding graphics rendering tasks than HMD 310.

Link 315 comprises a medium over which image data (for example, a color image, and a depth map associated with a frame to be displayed at HMD 310) can be sent and received between the electronic device 305 and HMD 310. According to some embodiments, the link 315 is a physical link, examples of which may include, without limitation, an Ethernet cable, a fiber optic cable, or a universal serial bus ("USB") cable. According to certain embodiments, link 315 is a wireless link, such as a BLUETOOTH or WI-FI. In some embodiments, link 315 is associated with specific transmission protocols, such as 5G protocols, and has a finite capacity, or bandwidth with regard to the rate at which data can be passed between the electronic device 305 and the HMD 310.

FIG. 4 illustrates aspects of an XR viewing experience provided at an HMD (for example, HMD 310 in FIG. 3) according to certain embodiments of this disclosure. The example shown in FIG. 4 is for illustration only and other examples could be used without departing from the scope of the present disclosure.

Referring to the non-limiting example of FIG. 4, the physical components of an operating environment 400 for viewing an XR display on HMD 405 are shown in the top half of FIG. 4. As shown in this illustrative example, the operating environment 400 comprises a room with at least three fixed planar surfaces: floor 410, first wall 415 and second wall 420, each of which are physical objects with which digital objects may appear to interact with in an XR display. According to some embodiments, physical objects and digital objects in an XR display at HMD 405 appear to be subject to a common set of laws of physics, such as gravity, shown by arrow 425.

According to certain embodiments, the HMD 405 comprises an untethered head-mounted display (for example, the device 100 in FIG. 1) worn on a head of a user 401, such as a pair of sunglasses. In some embodiments, the HMD 405 comprises a clear lens 407 through which the user 401 can view objects in operating environment 400, and upon which the HMD 405 can project digital objects into user 401's field of view to provide an extended reality display.

According to certain embodiments, the features of an XR display include digital content that is displayed to a viewer, such that it appears like a physical object within the live view of the physical world. The digital objects are, in some embodiments, dynamic, in at least the following two regards. First, the digital objects comprise animated content, which changes appearance independently of the pose of the apparatus (for example, HMD 405) providing the XR display, and for which the displaying device needs to receive pixels corresponding to the changes in the digital object. Second, the digital objects are, in some embodiments, also dynamic in the sense that their appearance changes with the pose of the viewing apparatus, irrespective of whether pixels corresponding to changes in the underlying digital object have been received.

Referring to the non-limiting example of FIG. 4, a clock 440 is shown to illustrate an example of a digital object provided in an XR display. As shown in the top view of operational environment 400, wall 420 is bare. However, as shown in the second view of operational environment 400, that clock 440, which is a digital object displayed in an XR view of operational environment 400, is visible through HMD 405. According to some embodiments, the clock 440 is dynamic in the sense that the underlying source content presented to user 401 through HMD 405 changes (for example, the hands move over time), and also in the sense that the clock 440 changes appearance in response to changes in pose, such as, by getting larger as user 401 gets closer to wall 420, or is reprojected to reflect lateral movement by user 401's position within operational environment 400.

In certain embodiments, for digital objects, such as clock 440 to appear convincingly 3D when viewed at HMD 405, the image data describing the appearance of clock 440 comprises at least the following two data channels: 1.) an image (for example, an RGB image file), comprising a two-dimensional representation of clock 440 from a specified pose; and 2.) a depth map, comprising a set of depth values for clock 440 at a specified pose. With these two data channels, a two-dimensional image of clock 440 can be projected and re-projected at HMD 405 to account for changes in pose. While a denser (having more points of data) depth map facilitates reprojection of clock 440 at HMD 405, the transmission of such a depth map typically requires sending more data across the data link between an electronic device (for example, electronic device 100 in FIG. 1) and the HMD. As noted elsewhere in this disclosure, the data link between an electronic device and a viewing device (for example, HMD 405) can be a performance bottleneck in XR, AR and VR systems. Simply put, in many real-world applications, the amount of data that can be sent across the data link is limited by, without limitation, the inherent bandwidth of the communication link, and the frame rate at which the data is displayed. For example, in many embodiments, the data associated with one second's worth of image content cannot, on average, sustainably require more than a second to transmit across a data link connecting the electronic device to the viewing device. Thus, in systems where image data is transferred from a first processing platform to a viewing platform across a data link, there is an inherent tension between minimizing the amount of data to be sent across a data link and maintaining a desired level of image quality in the image displayed at the viewing device.

Work-arounds to reduce the amount of data sent over the data link include transmitting a downsampled depth map across the data link. As used in this disclosure, the term "downsampling" encompasses the process of sampling, or pulling only a fractional subset of the available data points in a set. For example, if a depth map has 1024 points, such a depth map could be downsampled by taking every other point, to produce a smaller set with only 512 points. Similarly, the above-described 1024 point depth map could be downsampled by taking every fourth point, to produce a smaller set of depth data, comprising only 256 data points. However, the data transmission savings associated with downsampling depth map data are often realized at the expense of the quality of images based on the downsampled depth map. While some of the detail of the original depth map can be recovered through upsampling, or interpolation of the downsampled depth map, the limits of such approaches are visible in the projected images, in which digital objects appear with wavy, or unstable edges, thereby undermining the extent to which digital objects based on the image data appear three-dimensional.

While FIG. 4 describes aspects of providing digital objects for display at an HMD based on data comprising an image file and a depth map in the context of an XR presentation, the present disclosure is not so limited. The same, or similar, technical challenges and issues also arise in providing digital objects for display in augmented reality (AR) and virtual reality displays. As such, the performance benefits provided certain embodiments according to this disclosure can be realized, at a minimum, in AR, XR and VR systems.

Figure 5A:
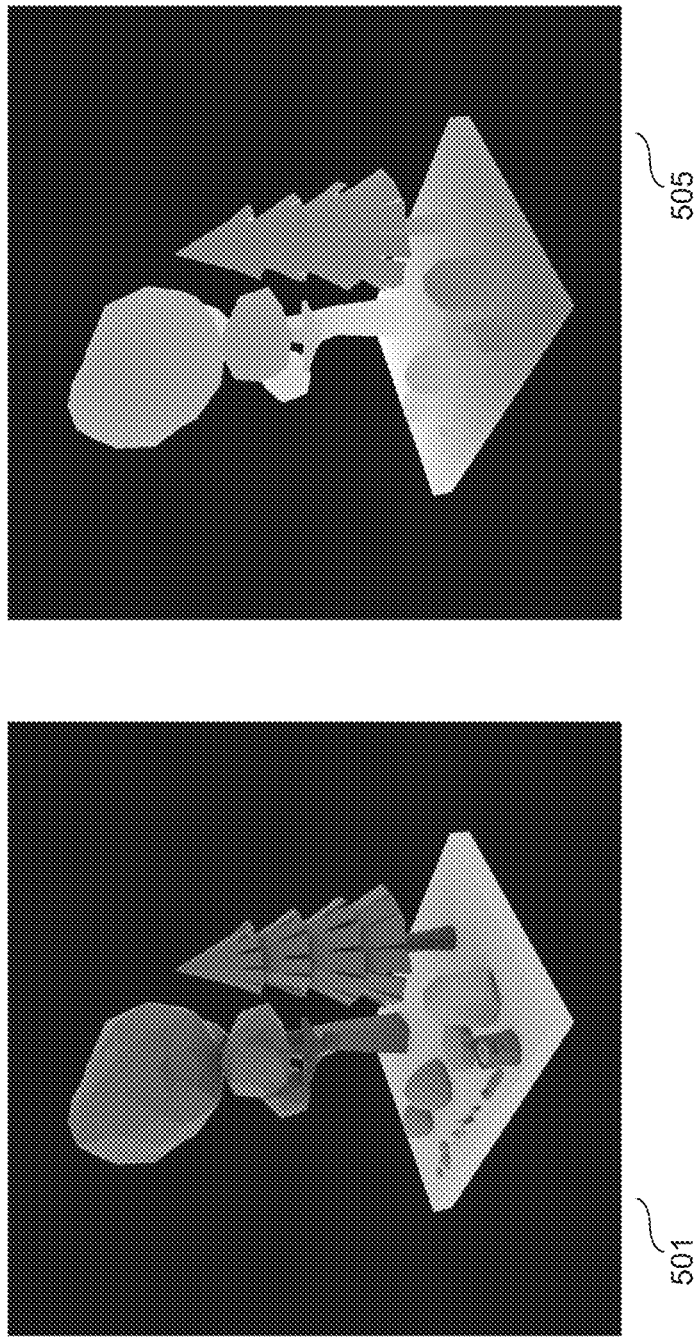
FIG. 5A illustrates an example of a color image and a full-resolution depth map, according to various embodiments of this disclosure.

FIG. 5A illustrates an example of image data comprising an RGB image and a depth map of a digital object to be projected at a viewing device (for example apparatus 200 in FIG. 2) and a depth map for the color image. FIG. 5B illustrates two examples of downsampling schema. For convenience of cross reference, elements common to both figures will be numbered similarly.

Referring to the non-limiting example of FIG. 5A, an RGB image 501 is shown in the figure. According to certain embodiments, RGB image 501 is a multi-color, pixelated rendering of one or more digital objects to be provided in an AR, VR or XR display from a given pose of the viewing device. In certain embodiments, RGB image 501 is a color image, and in some embodiments, RGB image 501 can be a monochrome, or single color channel image. As shown in FIG. 5A, RGB image 501 is a full resolution (for example, containing all the rendered pixels) image of the digital object. In some embodiments, RGB image 501 is a projection of a digital object (for example, a collection of trees and rocks) from the system's understanding of the current pose of a viewing device. Importantly, RGB image 501 comprises a two-dimensional channel of image data provided to the electronic device that presents a VR, AR or XR display to a user. As shown in this illustrative example, RGB image 501 contains color textures (for example, changes in intensity and luminosity, such as between shadows and highlights), and line details (for example, edges) of the digital object(s).

Referring further to the illustrative example of FIG. 5A, a depth map 505 is shown in the figure. According to certain embodiments, depth map 505 comprises a representation of the distance, or depth from a viewpoint, which can be used to reproject, or adjust RGB image 501 in response to changes in viewpoint.

In this illustrative example, objects at a closer depth in depth map 505 are shaded dark, and objects at a greater depth at depicted at a lighter level of shading. In certain embodiments, depth map 505 is a full-resolution depth map, meaning that for each pixel of color image, there is a corresponding pixel, or element of depth map 505.

By providing a displaying device with both color image and depth data the appearance of the visual elements of RGB image 501 (for example, the evergreen tree in the foreground) can change in response to changes in viewpoint in a way that convincingly mimics that of real, 3D objects. However, as noted elsewhere in this disclosure, in certain systems in which the computational load for providing an XR display is split across two computing platforms, wherein a first computing platform generates a color image and depth map, transmitting a full-resolution depth map across the data link (for example, a WI-FI connection) to the second computing platform presents a performance bottleneck, for which the preferred work-around is to reduce the volume of data sent across the data link by sending a reduced, or downsampled depth map to the second device. As discussed elsewhere in this disclosure, certain embodiments according to this disclosure provide, without limitation, the performance benefits of being able to send a reduced, or downsampled depth map without the historical tradeoffs with regard to the quality of image displayed at the second computing platform.

FIG. 5B illustrates aspects of downsampling and downsampling schema. In the example shown in FIG. 5B, image 510 illustrates aspects of a first downsampling schema, as applied to depth map 505. A reduced depth map is generated by retaining the data of depth map 505 at the sample points shown as a grid of dots in the figure. In this illustrative example, a 1/24 downsampling schema has been applied, wherein sample points are taken at regular 24 pixel intervals along the horizontal and vertical axes of the original full resolution depth map. As shown in FIG. 5B, by applying this downsampling schema to an original depth map comprising approximately 1,000,000 points, the downsampled depth map comprises 1,849 points—about $\frac{1}{500}^{th}$ of the original size of the full resolution depth map.

While the downsampling schema shown in image 510 effects a significant reduction in the amount of depth map data to be sent from a first computing platform to a second computing platform, a significant amount of unnecessary data remains captured in the downsampled depth map, as the set of sample points in the depth map includes a large number of points in the background area, which cannot be used for reprojecting the digital objects in RGB image 501.

Referring to the illustrative example of FIG. 5B, image 515 shows a downsampling schema, by which the volume of data to be transmitted from a first computing platform to a second computing platform can be further reduced. As shown in the example of image 515, the data set of the downsampled depth map can be further reduced by excluding sample points that map to the background, rather than the digital object represented in RGB image 501. In this way, original depth map 505 can be further reduced to a set of 421 object points.

As discussed elsewhere in this disclosure, the data savings obtained by downsampling a full resolution depth map typically come at the cost of image quality in the image as reprojected at the viewing device. While conventional methods, such as interpolation can recover some detail from an original full-resolution image, there are limits to what these approaches can achieve. Specifically, upsampled (or interpolated) depth maps suffer from a "chunkiness" in the recovered depth map, consisting of block-shaped regions of a single depth value in locations where the original, full-resolution depth map contained clean edges. The aforementioned chunkiness, and lack clean edges in such recovered depth maps can translate to a diminished viewing experience, wherein digital objects appear wavy, or unstable edges, and no longer convincingly mimic physical objects.

Figure 6:
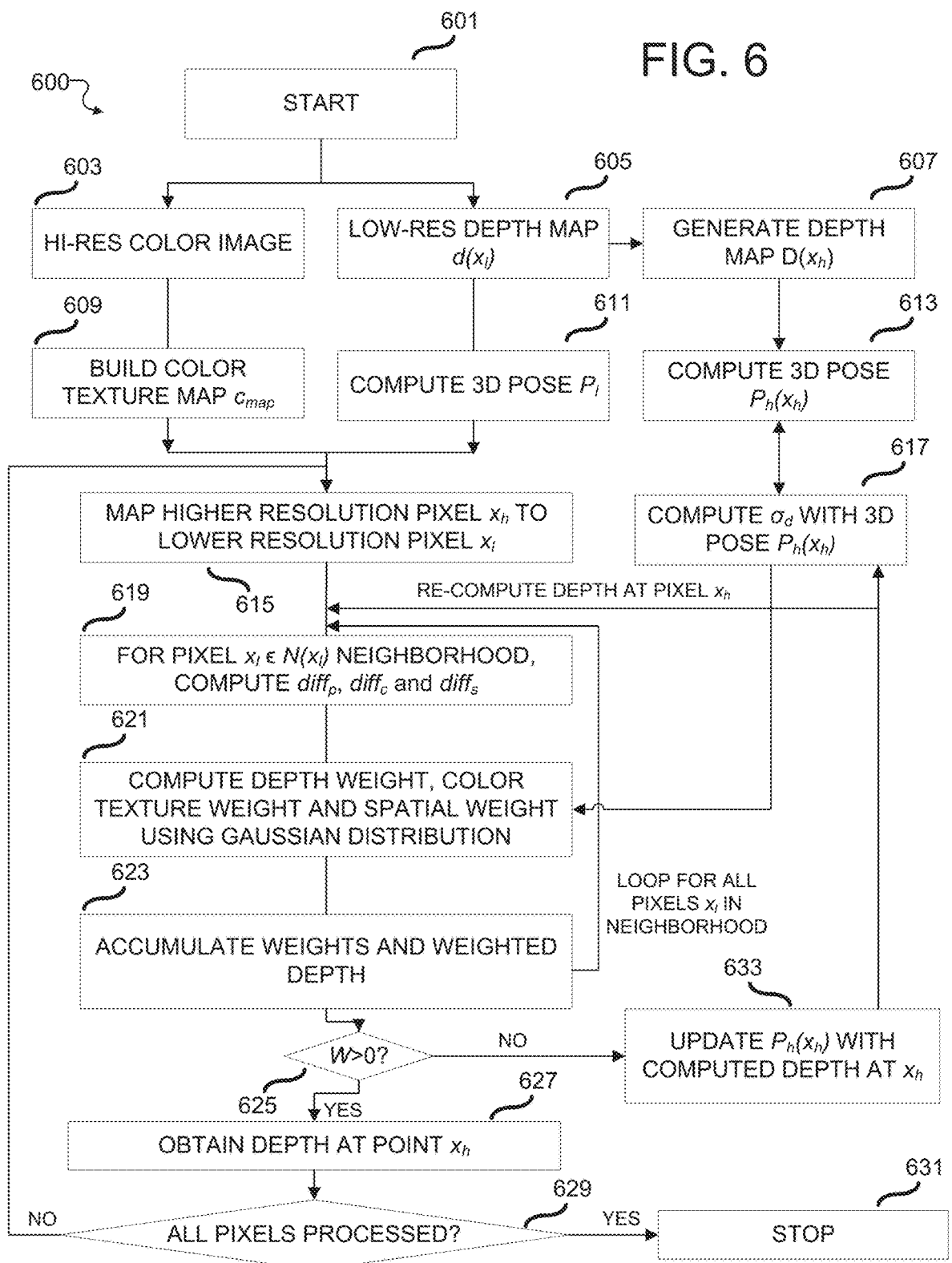
FIG. 6 illustrates operations of an example method for generating a super-resolution depth map according to certain embodiments of this disclosure.

FIG. 6 illustrates operations of an example of a method 600 for recovering a downsampled depth map according to various embodiments of this disclosure. Specifically, FIG. 6 describes an example of an image guided depth super-resolution process for recovering higher-resolution depth from a downsampled depth map.

The operations described with reference to FIG. 6 can be performed on any suitable apparatus (for example, apparatus 200 in FIG. 2) with a processor that is configured to receive image data from another computing platform (for example, electronic device 100 in FIG. 1), and output a reprojected image to a display, or another apparatus with a display.

Referring to the non-limiting example of FIG. 6, method 600 starts at start operation 601, at which an electronic device (for example, head mounted display 310 in FIG. 3) receives (for example, from electronic device 305 via data link 315 in FIG. 3) image data. According to certain embodiments, the received image data comprises a color image 603 (for example, RGB image 501 in FIG. 5A) of a digital object to be presented on a display at a first resolution, and a downsampled depth map 605 (for example, the depth map shown with reference to image 515 in FIG. 5B) of the digital object. In certain embodiments, downsampled depth map 605 is at a resolution that is lower than the first resolution. In this explanatory example, each pixel $x_l$ of downsampled depth map 605 is associated with a depth value $d(x_l)$.

According to certain embodiments, at operation 607, an upsampled depth map is generated based on downsampled, low-resolution depth map 605. Each pixel $x_h$ of the upsampled depth map is associated with a depth value $D(x_h)$. In this illustrative example, the resolution of the depth map generated at operation corresponds to the first resolution (i.e., the resolution of high-resolution color image 603). As previously noted, at operation 607, the upsampled depth map is generated based on low-resolution depth map 605. Suitable techniques for upsampling low-resolution depth map 605 include, without limitation, simple interpolation between the sample points of low-resolution depth map 605 using, for example, a nearest neighbor or bilinear interpolation methods.

Referring to the non-limiting example of FIG. 6, at operation 609, a color texture map $c_{map}$, is generated based on high-resolution color image 603. According to certain embodiments, generating color texture map $c_{map}$ comprises obtaining a reverse UV-mapping (for example, with Blender, or an equivalent process) of high resolution color image 603 to obtain a 3D representation of the digital object based on textures (for example, a shadow or specular highlight on a curved surface) that can be recognized as indicators of an underlying 3D shape. According to some embodiments, color texture map $c_{map}$ comprises a spatial representation of luminosity values within high-resolution color image 603.

Referring to the illustrative example of FIG. 6, at operation 611, the apparatus computes a low-resolution 3D pose map, comprising, for each point in low resolution depth map 605, a coordinate value in a 3D space for the point. Put differently, for each point $x_l$ of low-resolution depth map 605, a 3-D pose value $P_l$ is computed. As used in the context of this disclosure, the expression "pose" refers to a coordinate expression of content displayed in the display in a coordinate system external to a camera or viewpoint.

According to certain embodiments, the computation of 3-D pose value $P_l$ is generated by performing a transform from the pinhole camera coordinate system of a depth map, where coordinates are expressed as in values of x, y and depth (where x and y are coordinates within the frame of the depth map) to an x, y, z coordinate system based on the following equations:

$$\begin{pmatrix} x \\ y \\ d \end{pmatrix} = K \begin{pmatrix} X \\ Y \\ Z \end{pmatrix} \quad (1)$$

Where K is a camera matrix, the 3-D pose (expressed as values of X, Y and Z) for a given point in a depth map can be expressed as:

$$\begin{pmatrix} X \\ Y \\ Z \end{pmatrix} = K_{inv} \begin{pmatrix} x \\ y \\ d \end{pmatrix} = \begin{pmatrix} k_{00}^{inv} & k_{01}^{inv} & k_{02}^{inv} \\ k_{10}^{inv} & k_{11}^{inv} & k_{12}^{inv} \\ k_{20}^{inv} & k_{21}^{inv} & k_{22}^{inv} \end{pmatrix} \begin{pmatrix} x \\ y \\ d \end{pmatrix} \quad (2)$$

Referring to the non-limiting example of FIG. 6, at operation 613, for each pixel, or point $x_h$ of the high resolution depth map generated at operation 607, a 3D pose value $P_h(x_h)$ is determined using a similar transform using the inverse of camera matrix K.

According to various embodiments of this disclosure, at operation 615, a mapping between each pixel $x_h$ of the depth map generated at operation 607 and each pixel $x_l$ of the low resolution depth map 605 is performed so that neighborhood-level comparisons can be performed based on data obtained from both low-resolution depth map 605 and the upscaled depth map generated at operation 607.

As shown in the example of FIG. 6, at operation 617, for each point $x_h$, a value of $\sigma_d$, where $\sigma_d$ is a parameter defining the extent of a neighborhood around point $x_h$, is determined based on the pose values $P_h(x_h)$ determined at operation 613.

Referring to the non-limiting example of FIG. 6, at operation 619, for each point of the resolution of downsampled depth map 605 as mapped in operation 615 to points of the upsampled depth map generated at operation 607, a normalized pose difference ($\text{diff}_p$) across a neighborhood of points for the point, a normalized color texture difference ($\text{diff}_c$) across the neighborhood of points for the point, and a normalized spatial difference ($\text{diff}_s$) across the neighborhood of points are calculated.

In some embodiments, for each point p in a neighborhood of points where $p \in N(p)$, normalized pose differences can computed as:

$$d_{pose\_norm} = \|d_{nn}(p) - d_d(p_{nn})\| \quad (3)$$

Where $d_{nn}(p)$ is a pose value for point p and $d_d(p_{nn})$ is a pose value for a point $p_{nn}$ in the neighborhood of point p. Point $p_{nn}$ is a point in upsampled depth map generated at operation 607, for which point p has mapped to a point in the upsampled depth map at operation 615.

Similarly, in other embodiments, for each point p in a neighborhood of points where $p \in N(p)$, normalized color texture differences can computed as:

$$d_{color\_norm} = \|c_{map}(p) - c_{map}(p_{nn})\| \quad (4)$$

Where $c_{map}(p)$ represents the value of the color texture map (generated at operation 609) for a point p, and $c_{map}(p_{nn})$ represents the value of the color texture map at a neighborhood point $p_{nn}$.

Still further, for each point p in a neighborhood of points where $p \in N(p)$, normalized spatial differences can computed as:

$$d_{spatial\_norm} = \|p - p_{nn}\| \quad (5)$$

Where p is a coordinate expression of point p, and $p_{nn}$ is a coordinate expression of a point $p_{nn}$ in the neighborhood. In this way, spatial changes between point p and points within its neighborhood can be accounted for.

As shown in the illustrative example of FIG. 6, at operation 621, values of a depth weight $W_d$, a color weight $W_c$, and a spatial weight $W_d$ for each point comprising the first resolution are determined using a Gaussian distribution, as specified by equations (6) and (7) below.

According to certain embodiments, for a given point p belonging to a neighborhood N of points q (e.g., where $q \in N$ and N is the neighborhood of pixel p), the depth weight $W_d$ for a point p can be calculated as:

$$W_d = G_{\sigma_d}(D_p - D_q) \quad (6)$$

$$G_\sigma(x) = \frac{1}{2\pi\sigma^2} \exp\left(-\frac{x^2}{2\sigma^2}\right) \quad (7)$$

Where $G_\sigma(x)$ is a Gaussian smoothing kernel function, as applied to $\sigma_d$, as determined at operation 617. Alternatively, in certain embodiments, $W_d$ can be expressed with reference to the normalized pose difference $d_{pose\_norm}$ obtained at operation 619, as shown below:

$$w_{pose} = e^{-(d_{pose\_norm} - \mu_d)^2 / 2\sigma_d^2} \quad (8)$$

Similarly, in some embodiments according to this disclosure, a color intensity weight $W_c$ can be calculated from intensity information (for example, luminosity values in the neighborhood of point p) of the color image according to equation (9) below.

$$W_c = G_{\sigma_c}(I_p - I_q) \quad (9)$$

Where $I_p$, $I_q$ are intensities of the color image at pixels p and q respectively, and $G_{\sigma_c}$ is a Gaussian smoothing kernel of the form specified by equation (7).

Similarly, in various other embodiments, $W_c$ can also be obtained from the normalized color texture difference values obtained at operation 619, as shown by equation (10) below:

$$w_{color} = e^{-(d_{color\_norm} - \mu_c)^2 / 2\sigma_c^2} \quad (10)$$

According to certain embodiments, the spatial weight $W_s$ for a given point p, in the neighborhood N of point q (i.e., where $q \in N$, and N is the neighborhood of pixel p) can be obtained from equation (11), below:

$$W_s = G_{\sigma_s}(\|p - q\|) \quad (11)$$

Where p and q are coordinates for pixels p and q, respectively, and $G_{\sigma_s}$ is a Gaussian smoothing kernel of the form set forth in equation (7).

Likewise, in certain other embodiments, Ws can also be obtained based on the normalized spatial difference for point p determined at operation 615, as shown below:

$$w_{space}=e^{-(d_{spatial\_norm}-\mu_s)^2/2\sigma_s^2} \quad (12)$$

According to certain embodiments, at operation 623, accumulated weights and weighted depth values are determined for each pixel p of the first resolution (i.e., for each pixel of the upscaled depth map generated at operation 607). In certain embodiments, the accumulated weight of a point p is determined based on the accumulated pose weight, color texture weight, and spatial weight of the points $p_{nn}$ in the neighborhood of point p. Specifically, the accumulated weight w across the points $p_{nn}$ in the neighborhood of point p can be shown by:

$$w=\Sigma_{p_{nn}\in N(p)} w_{p_{nn}} \quad (13)$$

Where, for each point $p_{nn}$, $w_{p_{nn}}$ is given by:

$$w_{p_{nn}}=w_{pose}w_{color}w_{space} \quad (14)$$

Similarly, a weighted depth v for point p can be determined by accumulating depth values across the points $p_{nn}$ in the neighborhood of point p, as shown below:

$$v=\Sigma_{p_{nn}\in N(p)} d_d(p_{nn}) \quad (15)$$

Where $d_d(p_{nn})$ is the depth at point $p_{nn}$ in the current iteration of a depth map based on $P_h(x_h)$. In certain embodiments, a candidate depth d(p) for each point p can be obtained by:

$$d(p)=v/w \quad (16)$$

According to various embodiments, at operation 625, a determination of whether the candidate depth value for point p satisfies an acceptability criterion. In certain embodiments, the acceptability criterion is whether the accumulated weight value w (for example, as determined by equation (13)) meets or exceeds a threshold value. In the non-limiting example of FIG. 6, the threshold value for the point is w>0.

As shown in the illustrative example of FIG. 6, if, the candidate depth value for point p satisfies the acceptability criterion, then method 600 proceeds to operation 627, wherein a depth value associated with point p, as mapped to a point in the current iteration of the high resolution pose map generated at operation 613 is set as the depth value for point p in a super-resolution depth map, and method 600 proceeds to operation 629, wherein a determination as to whether each pixel of the first resolution (for example, each point of the upscaled depth map generated at operation 613) has been processed. In the event that there are still further pixels to be processed, method 600 loops back to operation 615 and further iterations of method 600 are performed for the remaining pixels.

According to certain embodiments, if all of the pixels have been processed, method 600 proceeds to operation 631, wherein the process of recovering a super-resolution map from a downsampled depth map and a full-resolution color image stops, and the electronic device outputs, on a display, a reprojected image at the first resolution, wherein the reprojected image is based on the color image and the super-resolution depth map recovered by method 600.

As shown in FIG. 6, if the accumulated weights for a candidate point p do not satisfy an acceptability criterion, method 600 proceeds from operation 625 to operation 633, wherein the candidate depth value for point p (which corresponds to a point $x_h$ in the high resolution depth map) determined at operation 623 is used to update the value of $P_h(x_h)$ of the high resolution pose map, and operations 619 through 623 are reiterated for point p, and the depth at pixel p is re-computed. Note that, on this subsequent iteration of operations 619 through 623, $\sigma_d$ is recalculated based on the updated value of $P_h(x_h)$.

Figure 7:
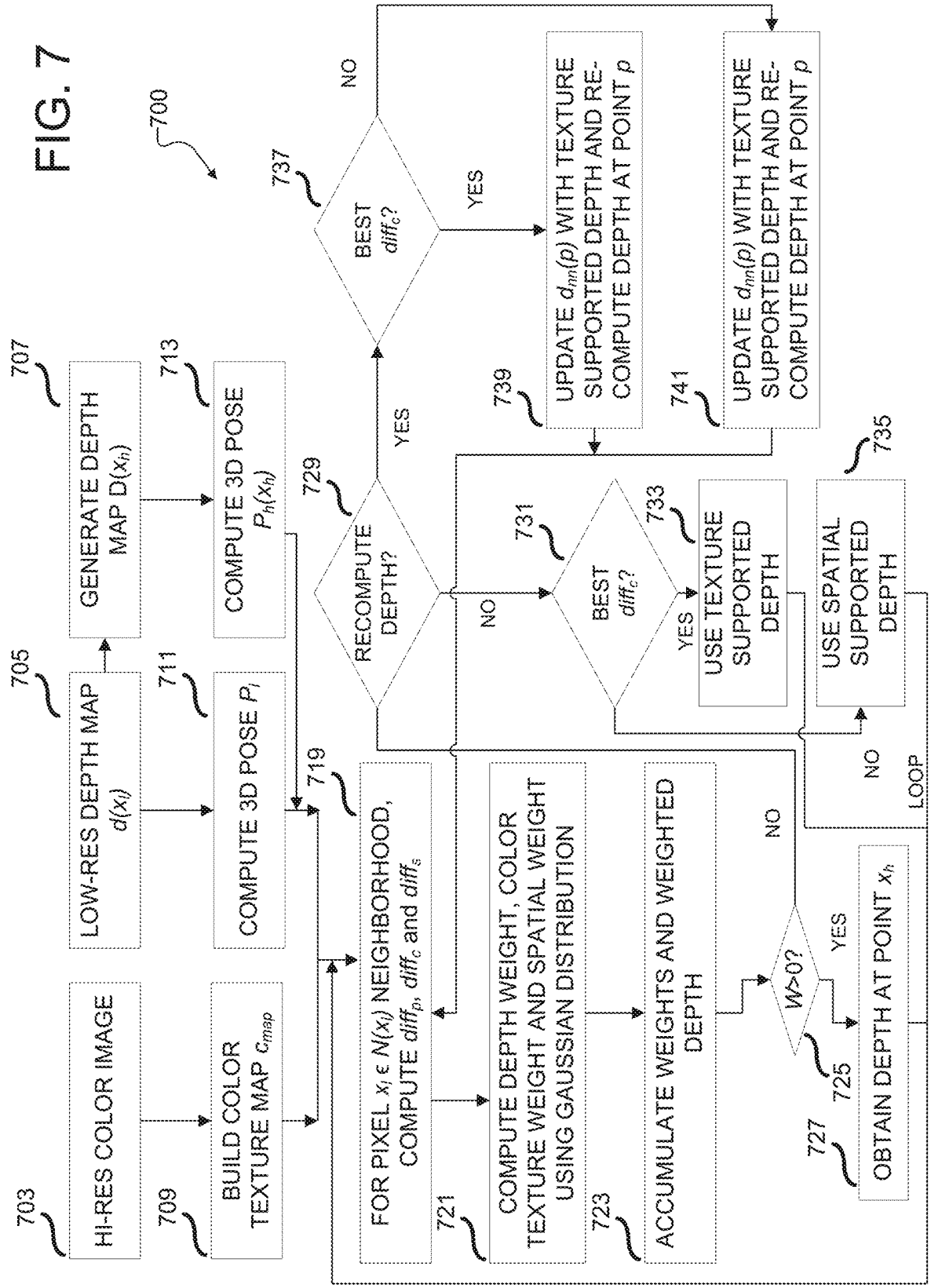
FIG. 7 illustrates operations of an example method for generating a super-resolution depth map according to some embodiments of this disclosure.

FIG. 7 illustrates an example of a method 700 for recovering a high resolution depth map from a downsampled depth map and a color image according to various embodiments of this disclosure. The operations described with reference to FIG. 7 can be performed on any suitable apparatus (for example, apparatus 200 in FIG. 2) with a processor that is configured to receive image data from another computing platform (for example, electronic device 100 in FIG. 1), and output a reprojected image to a display, or another apparatus with a display.

Referring to the non-limiting example of FIG. 7, in method 700, a computing platform receives a high-resolution color image 703 and a low resolution depth map 705 from another computing platform. In this illustrative example, high-resolution color image 703 comprises a set of rendered pixels (for example, high resolution color image 603 in FIG. 6) associated with a digital object to be reprojected as part of a display (for example, an XR display) provided on a display. According to certain embodiments, low resolution depth map 705 comprises a subset of data points from a full resolution (for example, a depth map having the same resolution as high-resolution color image 703) obtained by applying one or more downsampling schema to a source depth map. In certain embodiments, low resolution depth map 705 is equivalent to low-resolution depth map 605 in FIG. 6.

According to certain embodiments, at operation 707, an upsampled depth map is generated by applying one or more upsampling techniques (for example, interpolation, nearest neighbor or bilinear approaches, or techniques described with reference to operation 607 of FIG. 6). As shown in this illustrative example, each point within low resolution depth map 705 has a coordinate $(x_l)$ within low-resolution depth map 705 that can be mapped to a coordinate $(x_h)$ within the upsampled depth map generated at operation 707. While not shown in this example, certain embodiments of method 700 include a mapping operation between coordinates of low-resolution depth map 705 and the upsampled depth map generated at operation 707.

Referring to the illustrative example of FIG. 7, at operation 709, a color texture map $c_{map}$ is built from high-resolution color image 703. In certain embodiments, generating color texture map $c_{map}$ comprises obtaining a reverse UV-mapping (for example, with Blender, or an equivalent process) of high resolution color image 703 to obtain a 3D representation of the digital object based on textures (for example, a shadow or specular highlight on a curved surface) that can be recognized as indicators of an underlying 3D shape. According to some embodiments, color texture map $c_{map}$ comprises a spatial representation of luminosity values within high-resolution color image 703.

According to various embodiments, at operation 711, for each point of low-resolution depth map 705, a 3D pose map $P_l$ is determined by applying a transform (for example, the transform described with reference to operation 611 in FIG. 6) based on an inverse camera matrix $K_{inv}$ to depth and position coordinates of low-resolution depth map 705.

As shown in the explanatory example of FIG. 7, at operation 713, a high resolution 3D pose map $P_h$ is determined by applying a transform (for example, the transform described with reference to operation 611 in FIG. 6) based on an inverse camera matrix $K_{inv}$ to depth and position coordinates of the upsampled depth map generated at operation 713.

Referring to the non-limiting example of FIG. 7, at operation 719, values for a.) the normalized pose difference ($diff_p$) across a neighborhood of points for a point p with a coordinate $x_h$, b.) the normalized color texture difference ($diff_c$) across the neighborhood of points for the point p, and c.) the normalized spatial difference ($diff_s$) across the neighborhood of points for the point p are computed. According to certain embodiments, the values for $diff_p$, $diff_c$, and $diff_s$ are computed as described with reference to operation 619 in FIG. 6.

According to various embodiments, at operation 721, values for: a.) depth weight $W_d$ for each point $p_{nn}$ within a neighborhood of points for a given point p at coordinate $x_h$, b.) spatial weight $W_s$ for each point $p_{nn}$ within the neighborhood of points for point p, and c.) the color texture weight $W_c$ for each point $p_{nn}$ within the neighborhood of points for point p are computed using a Gaussian distribution. In certain embodiments, the depth weight, color texture weight and spatial weight are computed as described with reference to operation 621 in FIG. 6.

Referring to the illustrative example of FIG. 7, at operation 723, for each point p, the depth weight, spatial weight and color texture weight for each point $p_{nn}$ in the neighborhood of point p are accumulated to determine an overall weight W. According to various embodiments, accumulated weight W can be determined as described with reference to operation 623 in FIG. 6. Additionally, at operation 723, a depth for each point $p_{nn}$ in the neighborhood of point p can be obtained based on the depth (for example, as obtained by applying a camera matrix to the current 3D pose map) at each point $p_{nn}$. The values of $p_{nn}$ can be accumulated to obtain an accumulated depth value D, which, when divided by the accumulated weighting value, W, yields a candidate depth at point p.

As shown in FIG. 7, at operation 725, a determination is performed as to whether the candidate depth value at point p satisfies an acceptability criterion. In this non-limiting example, the acceptability criterion is whether the accumulated weight W has a value greater than 0. According to various embodiments, if the candidate depth value p satisfies the acceptability criterion, then the candidate depth value is set as the depth for coordinate $x_h$, the 3D pose map is updated to reflect the determined depth value at coordinate $x_h$, and method 700 loops back to operation 719 to be performed on another point in the depth map generated at operation 707.

According to various embodiments, in the event that the candidate depth at point p does not satisfy the acceptability criterion specified by operation 725, method 700 proceeds to operation where a determination is made whether to recompute the depth at point p. In some embodiments, the determination whether to recompute the depth at point p is made based on one or more secondary factors, including, without limitation, the number of times a candidate depth for point p has been calculated, and the number of points of the upsampled depth map that still need to be processed according to method 700.

If it is determined not to recompute the depth at point p, then method 700 proceeds to operation 731, wherein a comparison of the value of the normalized color texture difference across the neighborhood of points for point p ($diff_c$) against the value of the normalized spatial difference across the neighborhood of points for point p ($diff_s$) is performed to determine whether the value of the normalized color texture difference ($diff_c$) is better (e.g., lower) than that of the normalized spatial difference across the neighborhood of points for point p ($diff_s$).

In the event that the normalized color texture difference is found to have the better value, method 700 proceeds to operation 733, wherein a weighted depth based on the accumulated color texture weights is set as the depth at point p, and method 700 loops back to operation 719 to be repeated on any unprocessed pixels. As shown in the illustrative example of FIG. 7, if the normalized spatial difference is found to have the better value, method 700 proceeds to operation 735, wherein a weighted depth based on the accumulated spatial weights over the neighborhood of points of point p is set as the depth at point p, and method 700 loops back to operation 719 for further iterations on unprocessed pixels.

According to certain embodiments, if, at operation 729, the criteria for recomputing depth are satisfied, method 700 proceeds to operation 737, where, as at operation 731, a comparison between the normalized color texture difference across the neighborhood of points of point p ($diff_c$) and the normalized spatial difference ($diff_s$) across the neighborhood of points of point p is performed to identify that has the lower, or better value.

Where the normalized color texture difference ($diff_c$) is determined at operation 737 to have the lower value, method 700 proceeds to operation 739, wherein the points of the depth map in the neighborhood of point p are updated based on depths determined based on the color texture map, and method 700 loops back to operation 719 to determine a new candidate depth for point p.

According to various embodiments, where the normalized spatial different (diffs) is determined at operation 737 to have the lower value, method 700 proceeds to operation 741, wherein the points of the depth map in the neighborhood of point p are updated based on depth determined based on spatial values, and method 700 loops back to operation 719 to determine a new candidate depth for point p.

FIGS. 8A through 8F are screenshots and tracings of screenshots of recovered depth maps and reprojected images to illustrate certain technical benefits provided by embodiments according to this disclosure.

The explanatory examples of FIGS. 8A through 8F illustrate aspects of trying to reproject RGB image 501 from FIG. 5A based on downsampled version of depth map 505. In the illustrative examples of FIGS. 8A through 8F, depth map 501 has been downsampled by applying a downsampling schema such as shown in FIG. 5B, wherein a 1/24 downsampling schema has been applied to the depth map 505, thereby crunching down the number of data points in the depth map from approximately 1 million depth points to between 500 and 2000 depth points (depending on whether only object points are retained in the downsampled depth map).

Figure 8A:
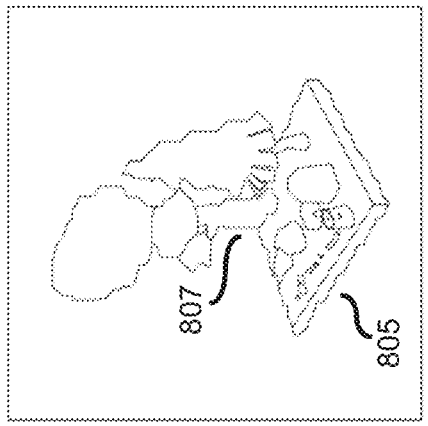
FIGS. 8A-8F illustrate aspects of technical benefits realized by certain embodiments of this disclosure.

FIG. 8A illustrates a visualization of a recovered depth map 801 generated by upsampling the downsampled depth map by interpolation, such as by using a bilinear or nearest neighbor method, to "fill in" values in between the sample points of the downsampled depth map. As shown in the figure, surfaces that, in original RGB image 501 and depth map 505, had straight edges, appear "chunky" or coarsely pixelated in the recovered depth map.

Figure 8B:
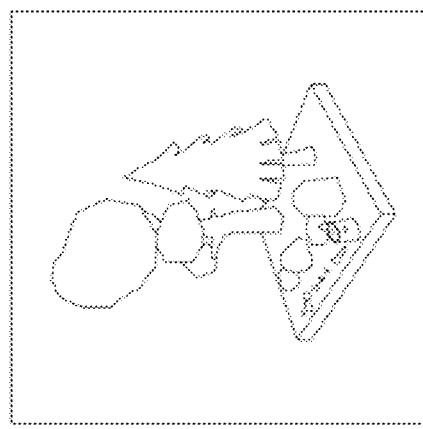

FIG. 8B illustrates a re-projected image 803 based on RGB image 501 and recovered depth map 801. As shown in the illustrative example of FIG. 8B, while re-projecting RGB image 501 based on recovered depth map 801 smooths out some of the "chunkiness" or coarse pixilation of the depth map, reprojected image 803 is visibly degraded compared to source image 501.

Figure 8C:
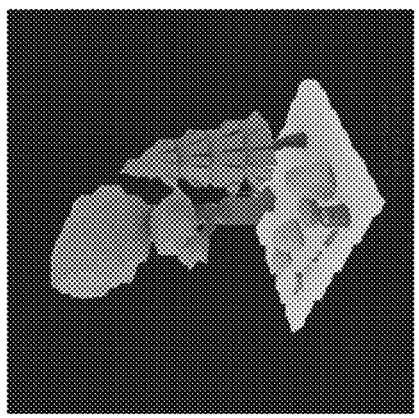

FIG. 8C is a line drawing tracing the edges of objects within reprojected image 803, to better illustrate the effect of unrecovered detail in the depth map on the quality of the reprojected image. As shown FIG. 8C, the quality of the edges of objects in the reprojected image is significantly degraded relative to original RGB image 501. For example, the previously straight lower edge 805 of the ground tile in RGB image 501 appears ragged in the reprojected image. Similarly, the lost detail in recovered depth map 801 results in a distorted bulge 807 in the trunk of the tall tree at the rear of the ground tile.

In practical terms, the degraded edges and distortions described with reference to FIGS. 8B and 8C translate to a viewing experience that can be unsatisfying or worse. At a minimum, the wobbly edges arising from reprojecting an image from a depth map in which the detail of the original map has been lost, make digital objects appear unreal and produce an unsatisfying XR/VR experience. In some cases, the irregularities and distortions in reprojected images based on degraded depth maps vary frame over frame, with the result that digital objects appear fuzzy or vibrating, which can cause headaches for some viewers.

Figure 8D:
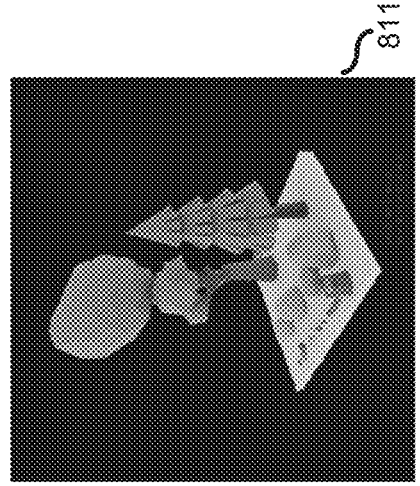
Figure 8E:
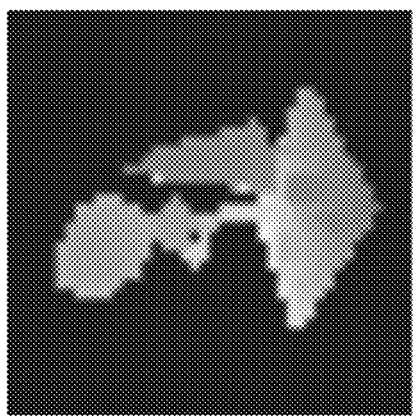
Figure 8F:
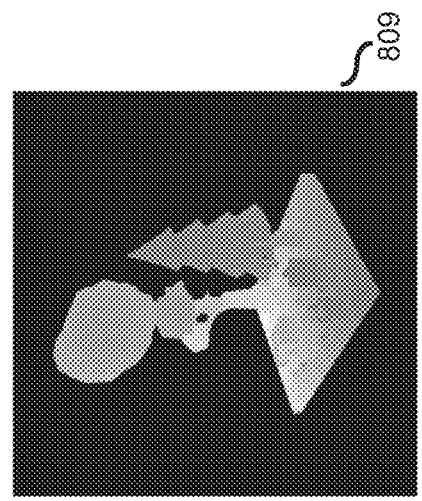

FIGS. 8D through 8F illustrate how certain embodiments according to this disclosure enable detail of a downsampled depth map to be sufficiently well recovered that the ragged edges and distortions described with reference to FIGS. 8A through 8C can be avoided.

Referring to the illustrative example of FIG. 8D, a visualization of a depth map 809 obtained by applying one or more methods (for example, method 600 in FIG. 6 or method 700) according to this disclosure to depth map 505. As shown in the example of FIG. 8D, by using RGB image 501 in upscaling the source depth map, significantly more detail can be recovered, as compared to the interpolative approach described with reference to FIG. 8A. Depth map 809 does not exhibit the same coarse pixilation and "chunkiness" as depth map 801.

FIG. 8E illustrates an example of a reprojected image 811 based on RGB image 501 and depth map 809. As compared to the image 803 in FIG. 8B, the improved quality and recovered detail in depth map 809 translate to an overall cleaner image, which does not, for example, exhibit the wobbly edges around the ground tile, or distortions in the tree trunk seen in FIG. 8B.

FIG. 8F is a line drawing tracing the edges of objects in image 811. Referring to the non-limiting example of FIG. 8F, the irregularities in the edge details shown in FIG. 8C are no longer present. In practical terms, the significant improvements in recovering depth map detail from a downsampled depth map provided by certain embodiments according to this disclosure include, without limitation, the ability to achieve the data savings associated with downsampling a depth map prior to transmitting it from a first computer platform to a second, with minimal to no surrender in the image quality of a reprojected image based on the recovered depth map.

Figure 9:
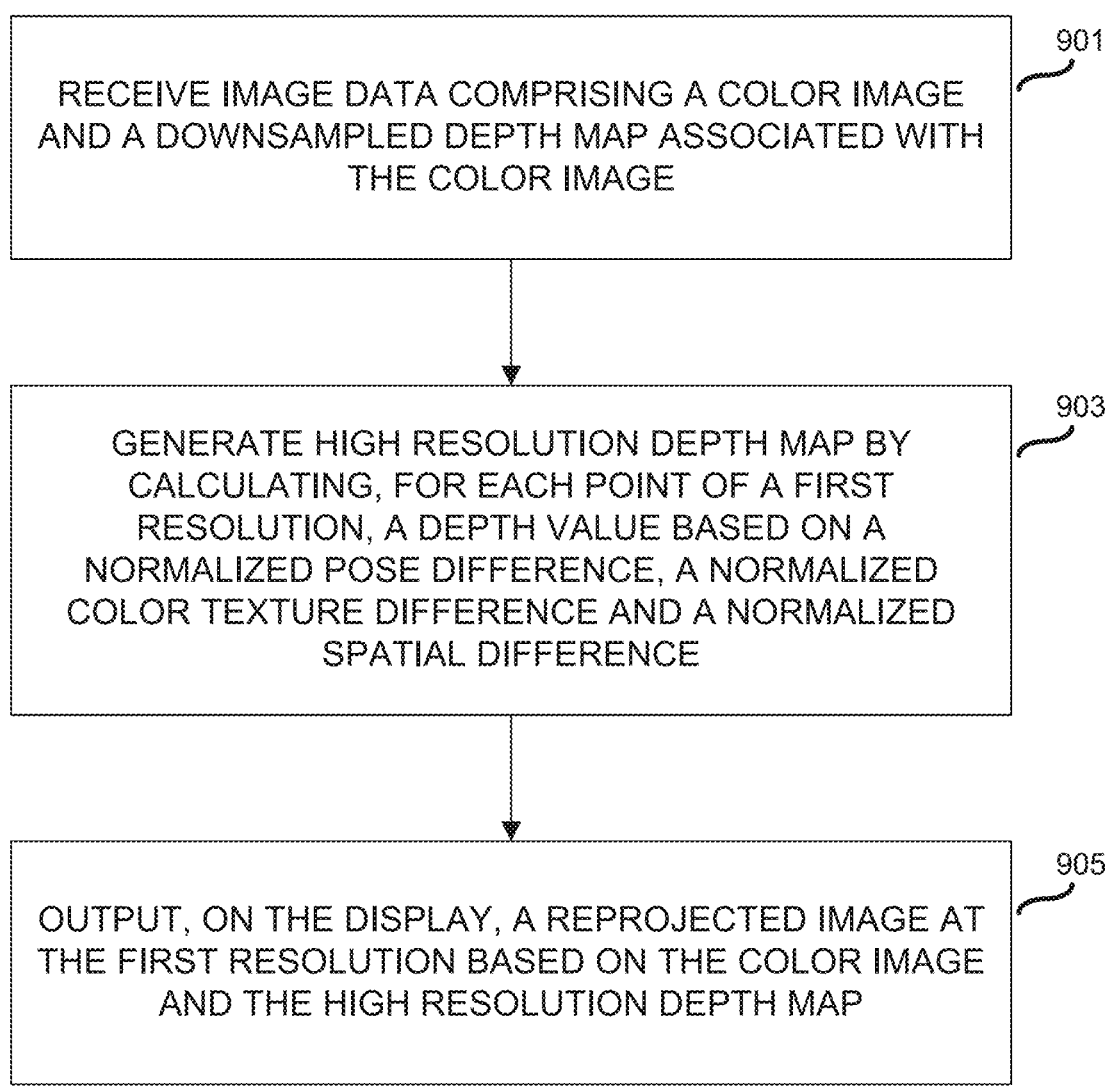
FIGS. 9-13 illustrate operations of example methods for recovering a depth map according to some embodiments of this disclosure.

FIG. 9 illustrates operations of an example method 900 for recovering a super-resolution depth map according to various embodiments of this disclosure. While the flow charts depict series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a processor in an electronic device, such as a XR device.

Referring to the non-limiting example of FIG. 9, at operation 901, an electronic device (for example, head mounted display 310 in FIG. 3, or electronic device 200 in FIG. 2), receives image data comprising a color image (for example, RGB image 501 in FIG. 5, or high-resolution color image 603 in FIG. 6) and a downsampled depth map (for example, low-resolution depth map 605 in FIG. 6) associated with the color image. According to certain embodiments, the color image comprises a set of pixels defining a first resolution, and the downsampled depth map comprises a set of sample points collected from a higher resolution depth map, such that the first resolution is greater than the number of sample points of the low-resolution depth map.

As shown in the explanatory example of FIG. 9, at operation 903, the electronic device generates a high resolution depth map (for example, depth map 809 in FIG. 8D) by calculating, for each point of the first resolution, a depth value based on a normalized pose difference, a normalized color texture difference, and a normalized spatial difference (for example, by iteratively looping operations 619 through 625 in FIG. 6, or by iteratively looping operations 719 through 725 in FIG. 7).

According to certain embodiments, at operation 905, the electronic device generates a reprojected image at the first resolution (for example, image 811 in FIG. 8E) based on the high resolution depth map generated at operation 903, and the high resolution color image provided as image data at operation 901. Further in some embodiments, the reprojected image at the first resolution is outputted at a display connected to the electronic device.

Figure 10:
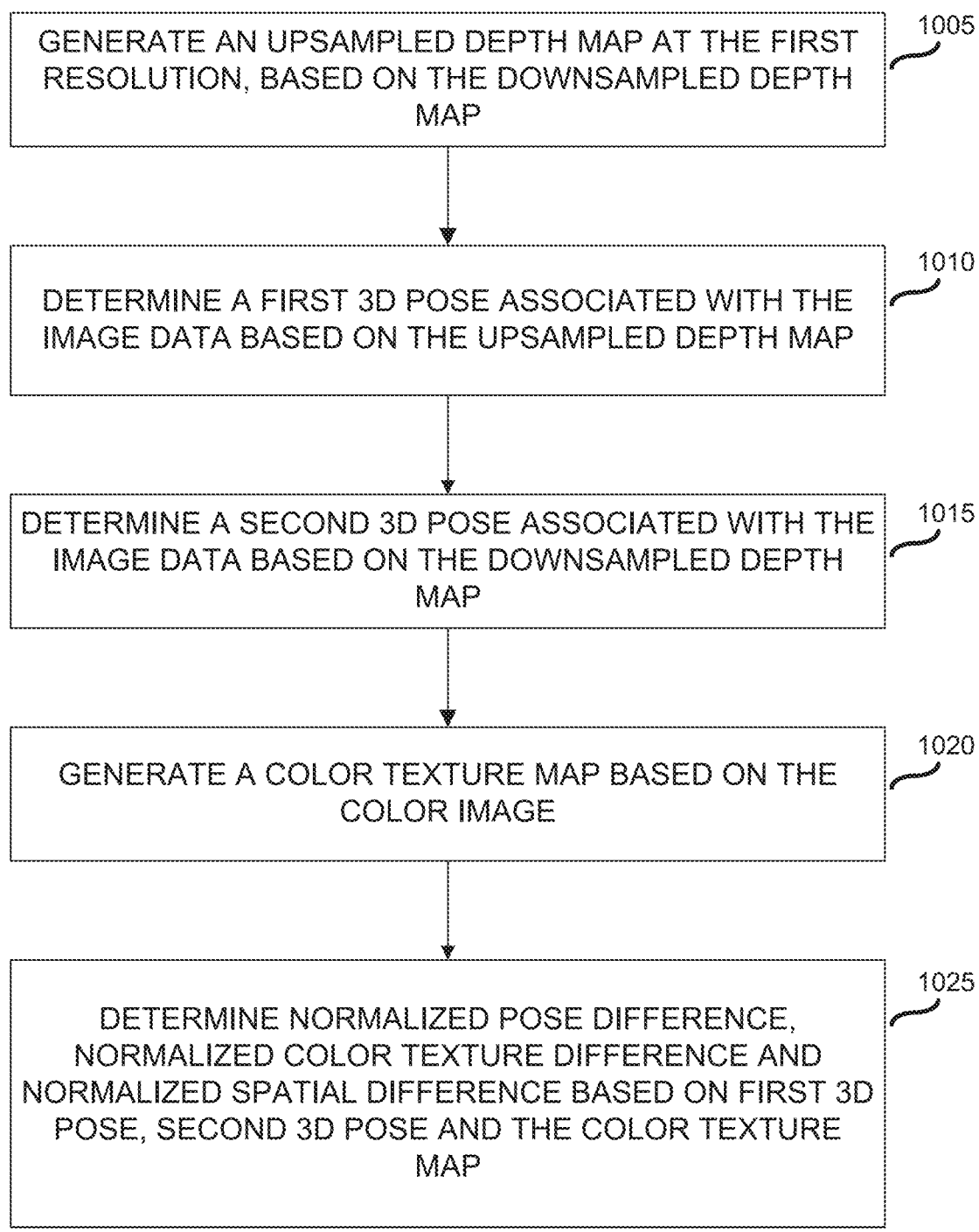

FIG. 10 illustrates an example of further operations for generating a high-resolution depth map according to certain embodiments of this disclosure. The operations described with reference to FIG. 10 may, in some embodiments, be performed as intermediate steps of another method (for example, operation 903 of method 900 in FIG. 9) for generating a recovered depth map.

Referring to the non-limiting example of FIG. 10, at operation 1005, an upsampled depth map at the first resolution is generated (for example, as shown with reference to operation 607 in FIG. 6) based on the low resolution depth map received at the electronic device. According to various embodiments, the upsampled depth map is generated using one or more interpolative upsampling methods, such as a nearest neighbor or bilinear approach.

According to various embodiments, at operation 1010, a first 3D pose map associated with the image data is generated based on the upsampled depth map generated at operation 1005. In some embodiments, the first 3D pose map is generated by applying an inverse camera matrix to coordinate values expressed as x, y, depth coordinates, to obtain x, y, z coordinate values, such as described with reference to operation 613 in FIG. 6.

As shown in the illustrative example of FIG. 10, at operation 1015, a second 3D pose map is generated based on the downsampled depth map received as part of the image data. In certain embodiments, the second 3D pose map is generated by applying an inverse camera matrix to coordinate values expressed as x, y, depth coordinates, to obtain x, y, z coordinate values, such as described with reference to operation 611 in FIG. 6.

Referring to the non-limiting example of FIG. 10, at operation 1020, the electronic device generates a color texture map (for example, as described with reference to operation 609 in FIG. 6) based on a high-resolution color image (for example, high-resolution color image 603 in FIG. 6).

According to various embodiments, at operation 1025, the electronic device determines a normalized pose difference across a neighborhood of points, a normalized spatial difference across the neighborhood of points, and a normalized color texture difference across the neighborhood of points of a point p for which a recovered depth value is to be determined. In certain embodiments, the normalized pose difference values are determined as described with reference to operation 619 in FIG. 6.

Figure 11:
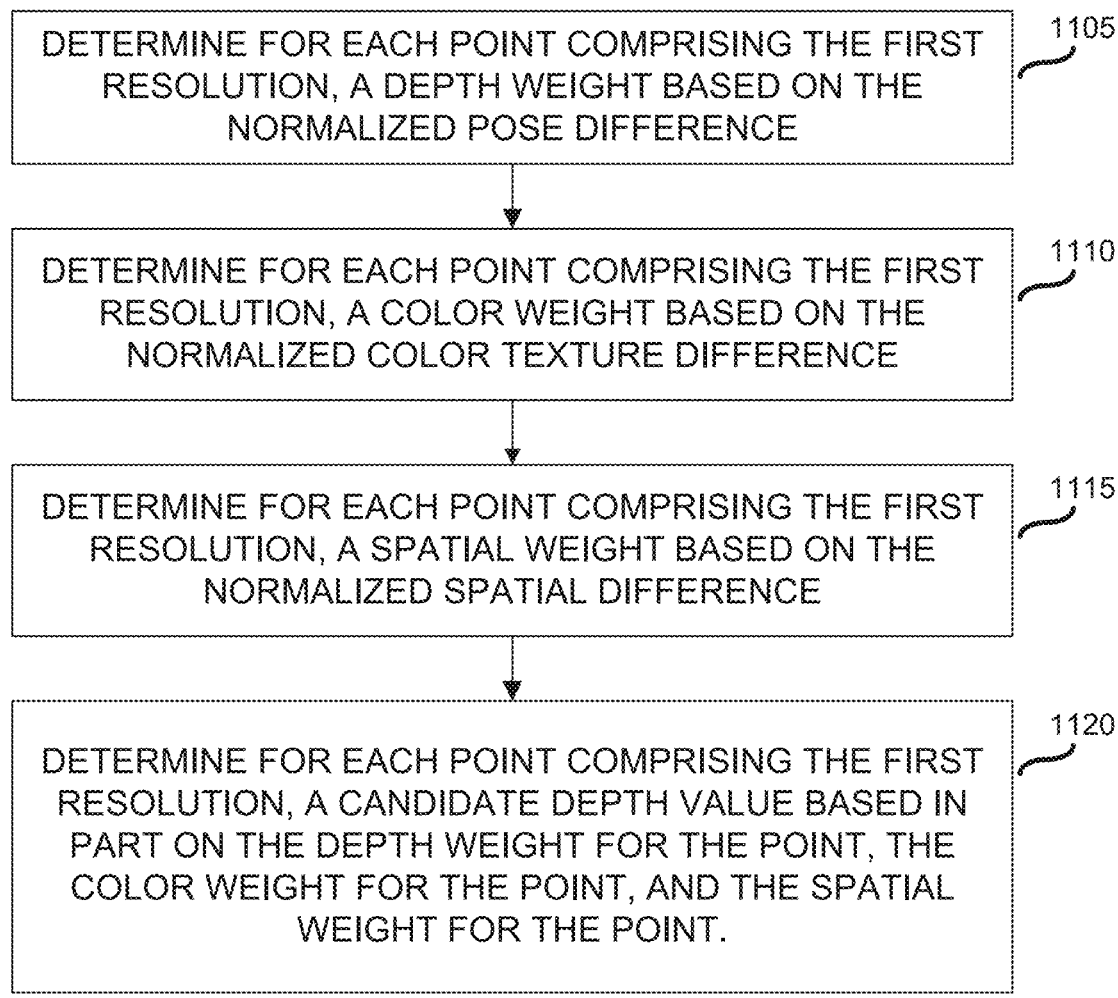

FIG. 11 illustrates an example of operations for generating a high resolution depth map (for example, depth map 809 in FIG. 8) according to certain embodiments of this disclosure. According to various embodiments, the operations described with reference to FIG. 11 may be performed as sub-steps of operations (for example, operation 903 in FIG. 9) of another method.

Referring to the non-limiting example of FIG. 11, at operation 1105, for each point p comprising the first resolution, a depth weight $W_d$ is determined based on a normalized pose difference across a neighborhood of points for point p. In certain embodiments, the normalized depth weight is computed as described herein with reference to operation 621 in FIG. 6, and equations (6)-(8).

According to some embodiments, at operation 1110, for each point p comprising the first resolution, a color texture weight Wc is determined based on the normalized color texture difference across the neighborhood of points for point p. In some embodiments, Wc is computed as described herein with reference to operation 621 in FIG. 6, and equations (7) and (9).

As described in the explanatory example of FIG. 11, at operation 1115, for each point p comprising the first resolution, a spatial weight Ws is determined based on the normalized spatial difference across the neighborhood of points for point p. In some embodiments, Ws is computed as described herein with reference to operation 621 in FIG. 6, and equations (7), (11) and (12).

Referring to the non-limiting example of FIG. 11, for each point p comprising the first resolution a candidate depth value is determined based on the depth weight, color texture weight and spatial weights determined at operations 1005-1015. In certain embodiments, the candidate depth is determined as described with reference to operation 623 in FIG. 6.

Figure 12:
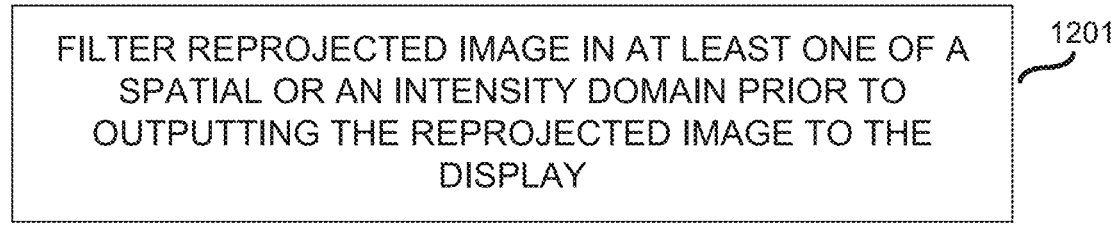

FIG. 12 illustrates a further example of an operation for recovering a depth map according to various embodiments of this disclosure. Referring to the non-limiting example of FIG. 12, in certain embodiments, prior to outputting a reprojected image to a display (for example, prior to operation 905 in FIG. 9), a reprojected image is filtered in one or more of a spatial or an intensity domain to help further preserve edges within the image.

Figure 13:
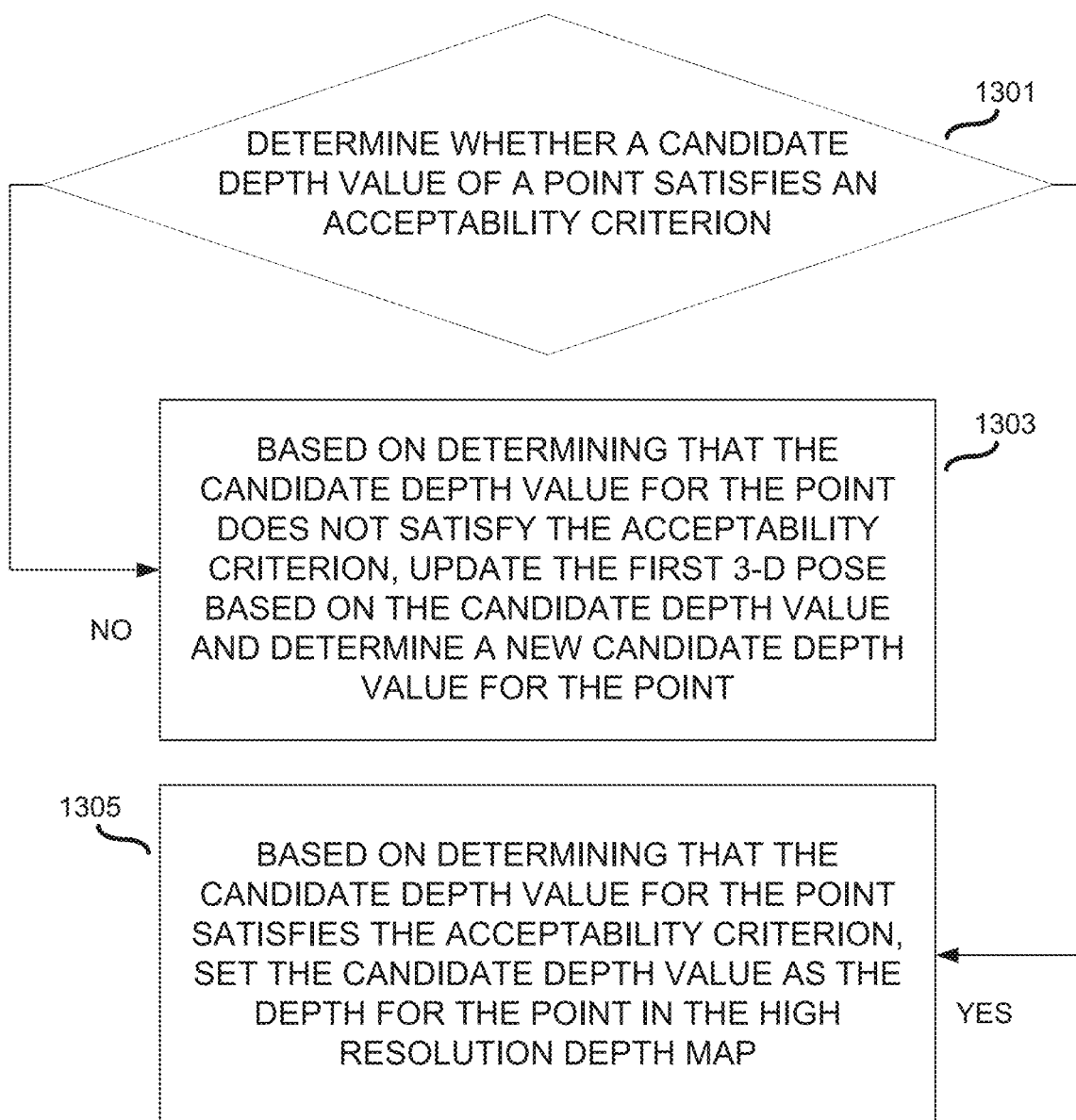

FIG. 13 illustrates an example of further operations of methods for recovering a high-resolution depth map from a downsampled depth map, according to various embodiments of this disclosure. According to certain embodiments, the operations described with reference to FIG. 13 can be performed as part of any suitable method (for example, method 900 in FIG. 9) according to embodiments described herein.

Referring to the non-limiting example of FIG. 13, at operation 1301, the electronic device performs a determination as to whether a candidate depth for a point p of the first resolution satisfies an acceptability criterion. Examples of acceptability criteria include, without limitation, whether the value of one or more weights determined for pose, color texture and spatial, either singly, or collectively meet a threshold value (for example, whether W>0, as shown in operation 625 in FIG. 6).

According to various embodiments, if it is determined at operation 1301 that the candidate depth for point p does not satisfy the acceptability criterion, the method proceeds to operation 1303, wherein the first 3D pose map (for example, the pose map generated at operation 613 in FIG. 6) is updated based on the candidate depth value, and the candidate depth for point p is recomputed.

As shown in the explanatory example of FIG. 13, if it is determined at operation 1301 that the candidate depth for point p satisfies the acceptability criterion, the method proceeds to operation 1305, wherein the candidate depth value is set as the depth value for point p in the high-resolution depth map.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for reconstructing a downsampled depth map, the method comprising:
    receiving, at an electronic device, image data to be presented on a display of the electronic device at a first resolution, wherein the image data comprises a color image and the downsampled depth map associated with the color image;
    generating a high resolution depth map by calculating, for each point of a reprojected image at the first resolution, a depth value based on a normalized pose difference across a neighborhood of points for the point, a normalized color texture difference across the neighborhood of points for the point, and a normalized spatial difference across the neighborhood of points for the point; and
    outputting, on the display, the reprojected image at the first resolution based on the color image and the high resolution depth map,
    wherein the downsampled depth map is at a resolution less than the first resolution.

2. The method of claim 1,
    wherein the normalized color texture difference is determined based on the color image, and
    wherein the normalized pose difference is determined based on the downsampled depth map.

3. The method of claim 1, wherein generating the high resolution depth map further comprises:
    generating an upsampled depth map at the first resolution based on the downsampled depth map;
    determining a first 3D pose associated with the image data based on the upsampled depth map;
    determining a second 3D pose associated with the image data based on the downsampled depth map; and
    generating a color texture map based on the color image, and
    wherein the normalized pose difference, the normalized color texture difference and the normalized spatial difference across the neighborhood of points are determined based on the first 3D pose, the second 3D pose, and the color texture map.

4. The method of claim 3, wherein generating the high resolution depth map further comprises:
- determining, for each point comprising the first resolution, a depth weight based on the normalized pose difference across the neighborhood of points for the point;
- determining, for each point comprising the first resolution, a color weight based on the normalized color texture difference across the neighborhood of points for the point;
- determining, for each point comprising the first resolution, a spatial weight based on the normalized spatial difference; and
- determining, for each point comprising the first resolution, a candidate depth value based in part on the depth weight for the point, the color weight for the point, and the spatial weight for the point.

5. The method of claim 4, further comprising:
- determining whether the candidate depth value of a point satisfies an acceptability criterion;
- based on determining that the candidate depth value for the point does not satisfy the acceptability criterion, updating the first 3D pose based on the candidate depth value, and determining a new candidate depth value for the point; and
- based on determining that the candidate depth value for the point satisfies the acceptability criterion, setting the candidate depth value as a depth for the point in the high resolution depth map,
- wherein the acceptability criterion is a threshold value of an accumulated weight of the depth weight, in combination with the color weight and the spatial weight.

6. The method of claim 3, wherein the upsampled depth map is generated by interpolating points of the downsampled depth map.

7. The method of claim 1, further comprising:
- filtering the reprojected image in at least one of a spatial or an intensity domain prior to outputting the reprojected image to the display.

8. An electronic device comprising:
- a display;
- a processor; and
- a memory containing instructions, which when executed by the processor, cause the processor to:
  - receive image data to be presented on the display of the electronic device at a first resolution, wherein the image data comprises a color image and a downsampled depth map associated with the color image;
  - generate a high resolution depth map by calculating, for each point of a reprojected image at the first resolution, a depth value based on a normalized pose difference across a neighborhood of points for the point, a normalized color texture difference across the neighborhood of points for the point, and a normalized spatial difference across the neighborhood of points for the point; and
  - output, on the display, the reprojected image at the first resolution based on the color image and the high resolution depth map,
- wherein the downsampled depth map is at a resolution less than the first resolution.

9. The electronic device of claim 8,
- wherein the instructions when executed cause the processor to determine the normalized color texture difference based on the color image, and
- wherein the instructions when executed cause the processor to determine the normalized pose difference based on the downsampled depth map.

10. The electronic device of claim 8, wherein the instructions that when executed cause the processor to generate the high resolution depth map further comprise instructions that when executed cause the processor to:
- generate an upsampled depth map at the first resolution based on the downsampled depth map;
- determine a first 3D pose associated with the image data based on the upsampled depth map;
- determine a second 3D pose associated with the image data based on the downsampled depth map; and
- generate a color texture map based on the color image; and
- wherein the instructions when executed cause the processor to determine the normalized pose difference, the normalized color texture difference and the normalized spatial difference across the neighborhood of points based on the first 3D pose, the second 3D pose, and the color texture map.

11. The electronic device of claim 8, wherein the instructions when executed cause the processor to generate the high resolution depth map further comprise instructions that when executed cause the processor to:
- determine, for each point comprising the first resolution, a depth weight based on the normalized pose difference across the neighborhood of points for the point;
- determine, for each point comprising the first resolution, a color weight based on the normalized color texture difference across the neighborhood of points for the point;
- determine, for each point comprising the first resolution, a spatial weight based on the normalized spatial difference; and
- determine, for each point comprising the first resolution, a candidate depth value based in part on the depth weight for the point, the color weight for the point, and the spatial weight for the point.

12. The electronic device of claim 11, wherein the memory further contains instructions, which when executed by the processor, cause the electronic device to:
- determine whether the candidate depth value of a point satisfies an acceptability criterion;
- based on determining that the candidate depth value for the point does not satisfy the acceptability criterion, update the first 3D pose based on the candidate depth value, and determine a new candidate depth value for the point; and
- based on determining that the candidate depth value for the point satisfies the acceptability criterion, set the candidate depth value as a depth for the point in the high resolution depth map,
- wherein the acceptability criterion is a threshold value of an accumulated weight of the depth weight, in combination with the color weight and the spatial weight.

13. The electronic device of claim 10, wherein the instructions when executed cause the processor to determine the upsampled depth map by interpolating points of the downsampled depth map.

14. The electronic device of claim 8, wherein the memory further contains instructions, which when executed by the processor, cause the electronic device to:
- filter the reprojected image in at least one of a spatial or an intensity domain prior to outputting the reprojected image to the display.

15. A non-transitory computer-readable medium containing program code, which when executed by a processor, causes an electronic device to:
receive image data to be presented on a display of the electronic device at a first resolution, wherein the image data comprises a color image and a downsampled depth map associated with the color image;
generate a high resolution depth map by calculating, for each point of a reprojected image at the first resolution, a depth value based on a normalized pose difference across a neighborhood of points for the point, a normalized color texture difference across the neighborhood of points for the point, and a normalized spatial difference across the neighborhood of points for the point; and
output, on the display, the reprojected image at the first resolution based on the color image and the high resolution depth map,
wherein the downsampled depth map is at a resolution less than the first resolution.

16. The non-transitory computer-readable medium of claim 15,
wherein the program code when executed cause the electronic device to determine the normalized color texture difference based on the color image, and
wherein the program code when executed cause the electronic device to determine the normalized pose difference based on the downsampled depth map.

17. The non-transitory computer-readable medium of claim 15, wherein the program code when executed cause the electronic device to generate the high resolution depth map further comprises program code that when executed cause the electronic device to:
generate an upsampled depth map at the first resolution based on the downsampled depth map;
determine a first 3D pose associated with the image data based on the upsampled depth map;
determine a second 3D pose associated with the image data based on the downsampled depth map; and
generate a color texture map based on the color image; and
wherein the normalized pose difference, the normalized color texture difference and the normalized spatial difference across the neighborhood of points are determined based on the first 3D pose, the second 3D pose, and the color texture map.

18. The non-transitory computer-readable medium of claim 17, wherein the program code when executed cause the electronic device to generate the high resolution depth map further comprises program code that when executed cause the electronic device to:
determine, for each point comprising the first resolution, a depth weight based on the normalized pose difference across the neighborhood of points for the point;
determine, for each point comprising the first resolution, a color weight based on the normalized color texture difference across the neighborhood of points for the point;
determine, for each point comprising the first resolution, a spatial weight based on the normalized spatial difference; and
determine, for each point comprising the first resolution, a candidate depth value based in part on the depth weight for the point, the color weight for the point, and the spatial weight for the point.

19. The non-transitory computer-readable medium of claim 18, further comprising program code, which, when executed by the processor, cause the electronic device to:
determine whether the candidate depth value of a point satisfies an acceptability criterion;
based on determining that the candidate depth value for the point does not satisfy the acceptability criterion, update the first 3D pose based on the candidate depth value, and determine a new candidate depth value for the point; and
based on determining that the candidate depth value for the point satisfies the acceptability criterion, set the candidate depth value as a depth for the point in the high resolution depth map,
wherein the acceptability criterion is a threshold value of an accumulated weight of the depth weight, in combination with the color weight and the spatial weight.

20. The non-transitory computer-readable medium of claim 17, wherein the program code when executed cause the electronic device to generate the upsampled depth map by interpolating points of the downsampled depth map.

* * * * *